(12) United States Patent
Groenendaal et al.

(10) Patent No.: US 7,458,320 B2
(45) Date of Patent: Dec. 2, 2008

(54) POLYMER FOR HEAT-SENSITIVE LITHOGRAPHIC PRINTING PLATE PRECURSOR

(75) Inventors: Bert Groenendaal, Sinaai (BE); Johan Loccufier, Zwijnaarde (BE); Huub Van Aert, Pulderbos (BE); Marc Van Damme, Bonheiden (BE)

(73) Assignee: Agfa Graphics, N.V., Mortsel (BE)

( * ) Notice: Subject to any disclaimer, the term of this patent is extended or adjusted under 35 U.S.C. 154(b) by 47 days.

(21) Appl. No.: 10/530,992

(22) PCT Filed: Sep. 18, 2003

(86) PCT No.: PCT/EP03/50633

§ 371 (c)(1),
(2), (4) Date: Sep. 16, 2005

(87) PCT Pub. No.: WO2004/035686

PCT Pub. Date: Apr. 29, 2004

(65) Prior Publication Data

US 2006/0144269 A1    Jul. 6, 2006

(30) Foreign Application Priority Data

Oct. 15, 2002  (EP) .................... 02102444
Oct. 24, 2002  (US) .................... 60/420,907

(51) Int. Cl.
*G03F 7/004* (2006.01)

(52) U.S. Cl. .................. 101/453; 430/302; 400/100

(58) Field of Classification Search ........ None
See application file for complete search history.

(56) References Cited

U.S. PATENT DOCUMENTS

| | | | |
|---|---|---|---|
| 3,971,660 A | 7/1976 | Staehle | |
| 4,045,232 A | 8/1977 | Parkinson | |
| 4,115,128 A | 9/1978 | Kita | |
| 4,284,705 A | 8/1981 | Phlipot et al. | |
| 4,840,713 A | 6/1989 | Pliefke | |
| 4,897,168 A | 1/1990 | Boergerding et al. | |
| 4,981,517 A | 1/1991 | DeSanto, Jr. et al. | |
| 5,156,723 A | 10/1992 | Pliefke et al. | |
| 5,163,368 A | 11/1992 | Pensavecchia et al. | |
| 5,174,205 A | 12/1992 | Kline et al. | |
| 5,182,351 A | 1/1993 | Shiobara et al. | |
| 5,229,253 A | 7/1993 | Zertani et al. | |
| 5,314,787 A | 5/1994 | Elsaesser et al. | |
| 5,556,531 A | 9/1996 | Wiedemann | |
| 5,637,441 A | 6/1997 | Brenk et al. | |
| 5,641,608 A | 6/1997 | Grunwald et al. | |
| 5,695,903 A | 12/1997 | Elsaesser et al. | |
| 6,063,544 A | 5/2000 | Sheriff et al. | |
| 6,140,392 A | 10/2000 | Kingman et al. | |
| 6,190,825 B1 * | 2/2001 | Denzinger et al. | 430/192 |
| 6,221,989 B1 | 4/2001 | Furihata et al. | |
| 6,255,042 B1 | 7/2001 | Fiebag et al. | |
| 6,391,519 B1 * | 5/2002 | Kunita | 430/270.1 |
| 6,890,626 B1 | 5/2005 | Itatani | |
| 2004/0048195 A1 * | 3/2004 | Deroover et al. | 430/271.1 |

FOREIGN PATENT DOCUMENTS

| | | |
|---|---|---|
| DE | 12 31 712 | 1/1967 |
| DE | 40 01 466 A1 | 7/1991 |
| DE | 40 07 428 A1 | 9/1991 |
| DE | 40 27 301 A1 | 3/1992 |
| DE | 44 17 907 A1 | 11/1995 |
| DE | 44 23 140 A1 | 1/1996 |
| DE | 44 45 820 A1 | 6/1996 |
| EP | 0 291 760 A2 | 11/1988 |
| EP | 0 292 801 A2 | 11/1988 |
| EP | 0 537 633 A1 | 4/1993 |
| EP | 0 601 240 A1 | 6/1994 |
| EP | 0 619 524 A1 | 10/1994 |
| EP | 0 619 525 A1 | 10/1994 |
| EP | 0 620 502 A1 | 10/1994 |
| EP | 0 659 909 A1 | 6/1995 |
| EP | 0 823 327 A2 | 2/1998 |
| EP | 0 864 420 A1 | 9/1998 |
| EP | 0 934 822 A1 | 8/1999 |
| EP | 0 950 517 A1 | 10/1999 |
| EP | 0 982 123 A2 | 3/2000 |
| EP | 1 072 432 A2 | 1/2001 |
| FR | 2 300 354 | 9/1976 |
| GB | 1 084 070 | 9/1967 |

(Continued)

OTHER PUBLICATIONS

International Search Report for PCT/EP2003/050633 (Jan. 6, 2004).

(Continued)

*Primary Examiner*—Leslie J. Evanisko
*Assistant Examiner*—Joshua D. Zimmerman
(74) *Attorney, Agent, or Firm*—Leydig, Voit & Mayer, Ltd.

(57) ABSTRACT

A polymer for a heat-sensitive lithographic printing plate precursor is disclosed wherein the polymer comprises a phenolic monomeric unit wherein the H atom of the hydroxy group of the phenyl group of the phenolic monomeric unit is replaced by a group comprising a N-imide group and wherein the substitution of the polymer increases the chemical resistance of the coating of the printing plate precursor.

50 Claims, No Drawings

FOREIGN PATENT DOCUMENTS

| | | |
|---|---|---|
| GB | 1 419 512 | 12/1975 |
| JP | 20-96755 | 4/1990 |
| JP | 4-227624 | 8/1992 |
| JP | 60-88942 A1 | 3/1994 |
| WO | WO 97/39894 A1 | 10/1997 |
| WO | WO 99/17995 A2 | 1/1999 |
| WO | WO 99/21725 A1 | 5/1999 |
| WO | WO 00/32705 A1 | 6/2000 |

OTHER PUBLICATIONS

*J. Colloid and Interface Sci.*; vol. 26; pp. 62-89 (1968).

* cited by examiner

POLYMER FOR HEAT-SENSITIVE LITHOGRAPHIC PRINTING PLATE PRECURSOR

FIELD OF THE INVENTION

The present invention relates to a polymer for a heat-sensitive lithographic printing plate precursor.

BACKGROUND OF THE INVENTION

Lithographic printing presses use a so-called printing master such as a printing plate which is mounted on a cylinder of the printing press. The master carries a lithographic image on its surface and a print is obtained by applying ink to said image and then transferring the ink from the master onto a receiver material, which is typically paper. In conventional, so-called "wet" lithographic printing, ink as well as an aqueous fountain solution (also called dampening liquid) are supplied to the lithographic image which consists of oleophilic (or hydrophobic, i.e. ink-accepting, water-repelling) areas as well as hydrophilic (or oleophobic, i.e. water-accepting, ink-repelling) areas. In so-called driographic printing, the lithographic image consists of ink-accepting and ink-abhesive (ink-repelling) areas and during driographic printing, only ink is supplied to the master.

Printing masters are generally obtained by the so-called computer-to-film method wherein various pre-press steps such as typeface selection, scanning, color separation, screening, trapping, layout and imposition are accomplished digitally and each color selection is transferred to graphic arts film using an image-setter. After processing, the film can be used as a mask for the exposure of an imaging material called plate precursor and after plate processing, a printing plate is obtained which can be used as a master.

A typical printing plate precursor for computer-to-film methods comprise a hydrophilic support and an image-recording layer of a photosensitive polymer layers which include UV-sensitive diazo compounds, dichromate-sensitized hydrophilic colloids and a large variety of synthetic photopolymers. Particularly diazo-sensitized systems are widely used. Upon image-wise exposure, typically by means of a film mask in a UV contact frame, the exposed image areas become insoluble and the unexposed areas remain soluble in an aqueous alkaline developer. The plate is then processed with the developer to remove the diazonium salt or diazo resin in the unexposed areas. So the exposed areas define the image areas (printing areas) of the printing master, and such printing plate precursors are therefore called 'negative-working'. Also positive-working materials, wherein the exposed areas define the non-printing areas, are known, e.g. plates having a novolac/naphtoquinone-diazide coating which dissolves in the developer only at exposed areas.

In addition to the above photosensitive materials, also heat-sensitive printing plate precursors have become very popular. Such thermal materials offer the advantage of daylight-stability and are especially used in the so-called computer-to-plate method wherein the plate precursor is directly exposed, i.e. without the use of a film mask. The material is exposed to heat or to infrared light and the generated heat triggers a (physico-)chemical process, such as ablation, polymerization, insolubilisation by cross-linking of a polymer, heat-induced solubilisation, decomposition, or particle coagulation of a thermoplastic polymer latex.

The known heat-sensitive printing plate precursors typically comprise a hydrophilic support and a coating containing an oleophilic polymer, which is alkali-soluble in exposed areas (positive working material) or in non-exposed areas (negative working material) and an IR-absorbing compound. Such an oleophilic polymer is typically a phenolic resin.

WO99/01795 describes a method for preparing a positive working resist pattern on a substrate wherein the coating composition comprises a polymeric substance having functional groups such that the functionalised polymeric substance has the property that it is developer insoluble prior to delivery of radiation and developer soluble thereafter. Suitable functional groups are known to favor hydrogen bonding and may comprise amino, amido, chloro, fluoro, carbonyl, sulphinyl and sulphonyl groups and these groups are bonded to the polymeric substance by an esterification reaction with the phenolic hydroxy group to form a resin ester.

EP-A 0 934 822 describes a photosensitive composition for a lithographic printing plate wherein the composition contains an alkali-soluble resin having phenolic hydroxyl groups and of which at least some of the phenolic hydroxyl groups are esterified by a sulphonic acid or a carboxylic acid compound.

EP-A 1 072 432 describes an image forming material which comprises a recording layer which is formed of a composition whose solubility in water or in an alkali aqueous solution is altered by the effects of light or heat. This recording layer comprises a polymer of vinyl phenol or a phenolic polymer, wherein hydroxy groups and alkoxy groups are directly linked to the aromatic hydrocarbon ring. The alkoxy group is composed of 20 or less carbon atoms.

EP-A 0 982 123 describes a photosensitive resin composition or recording material wherein the binder is a phenolic polymer, substituted with a specific functional group on the aromatic hydrocarbon ring such as a halogen atom, an alkyl group having 12 or less carbon atoms, an alkoxy group, an alkylthio group, a cyano group, a nitro group or a trifluoromethyl group, or wherein the hydrogen atom of the hydroxy group of the phenolic polymer is substituted with a specific functional group such as an amide, a thioamide or a sulphonamide group. As a result, the coating of the recording material has such a high density that improves the intra-film transistivity of heat obtained by the light-to-heat conversion at the time of laser exposure. The high density of the coating makes the image recording material less susceptible to external influences such as humidity and temperature. Consequently, the storage stability of the image recording material can also be enhanced.

U.S. Pat. No. 5,641,608 describes a direct process for producing an imaged pattern on a substrate surface for printed circuit board application. The process utilises a thermo-resist composition which undergo a thermally-induced chemical transformation effective either to ablate the composition or to increase or decrease its solubility in a particular developer. The thermo-resist composition comprises phenolic polymers in which free hydroxyl groups are protected. Upon heating in the presence of an acid these protecting groups split off resulting in a solubility change of the composition. In positive thermo-resists the hydroxyl protecting groups may be ethers, such as alkyl-, benzyl-, cycloalkyl- or trialkylsilyl-ethers, and oxy-carbonyl groups.

During the lithographic printing process, the ink and fountain solution are continuously supplied to the lithographic printing plate. These liquids may attack the coating of the printing plate and, consequently, the resistance of the coating against these liquids, hereinafter referred to as "chemical resistance", may affect the printing run length. The most widely used polymers in these coatings are phenolic resins and it has been found that these resins and the phenolic resins, modified by a chemical substitution reaction on the hydroxyl group of the phenolic group as described in the above prior art, do not increase the chemical resistance sufficiently. The phenolic resin, modified as proposed in the present invention, enables to increase the chemical resistance of the coating and to improve the printing run length of the plate.

SUMMARY OF THE INVENTION

It is an aspect of the present invention to provide a polymer, comprising a phenolic monomeric unit wherein the H atom of the hydroxy group of the phenolic monomeric unit is replaced by a N-imide group Q having the structure

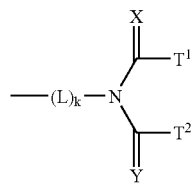

wherein L is a linking group, wherein k is 0 or 1, wherein L is covalently bound to the O atom of the polymer for k is 1, or wherein the N atom of the N-imide group is covalently bound to the O atom of the polymer for k is 0, wherein X or Y are independently selected from O or S, and wherein $T^1$ and $T^2$ represent a terminal group.

It is also an aspect of the present invention to provide a polymer as defined in claim 1, for a heat-sensitive lithographic printing plate precursor wherein the chemical resistance of the heat-sensitive coating against printing liquids and press chemicals is improved.

Specific embodiments of the invention are defined in the dependent claims.

DETAILED DESCRIPTION OF THE INVENTION

In order to obtain a heat-sensitive lithographic printing plate with an improved printing run length, it is important to increase the chemical resistance of the heat-sensitive coating against the printing liquids such as the dampening liquid and ink, and against the press chemicals such as cleaning liquids for the plate, for the blanket and for the press rollers. These printing properties are affected by the composition of the coating wherein the type of polymer is one of the most important components for this property.

In accordance with the present invention, there is provided a polymer, which comprises a phenolic monomeric unit wherein the H atom of the hydroxy group of the phenolic monomeric unit is replaced by a N-imide group Q having the structure

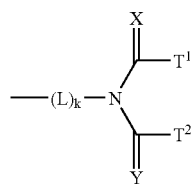

wherein L is a linking group, wherein k is 0 or 1, wherein L is covalently bound to the O atom of the polymer for k is 1, or wherein the N atom of the N-imide group is covalently bound to the O atom of the polymer for k is 0, wherein X or Y are independently selected from O or S, and wherein $T^1$ and $T^2$ represent a terminal group. The "N-imide group" referred to herein defines an imide group of which the N atom is coupled to the linking group or to the O atom of the phenolic monomeric unit.

It is also an aspect of the present invention that there is provided a heat-sensitive lithographic printing plate precursor comprising a support having a hydrophilic surface and an oleophilic coating, said coating comprising this polymer and an infrared absorbing agent.

It is also an aspect of the present invention that the oleophilic coating comprising this polymer has an increased chemical resistance due to the modification of the polymer by this specified N-imide group Q having the structure as defined above. This chemical resistance can be measured by several tests.

In accordance with a preferred embodiment of the present invention, the terminal groups $T^1$ and $T^2$ are independently selected from an optionally substituted alkyl, alkenyl, alkynyl, cycloalkyl, heterocyclic, aryl, heteroaryl, aralkyl or heteroaralkyl group, or wherein $T^1$ and $T^2$ together with the N-imide group represent the necessary atoms to form a cyclic structure, or wherein $T^1$ and $T^2$ represent the following structures -$L^1$-$R^1$ and -$L^2$-$R^2$ wherein $L^1$ and $L^2$ represent independently a linking group, wherein $R^1$ and $R^2$ are independently selected from hydrogen, an optionally substituted alkyl, alkenyl, alkynyl, cycloalkyl, heterocyclic, aryl, heteroaryl, aralkyl or heteroaralkyl group, halogen, —CN, or —$NO_2$, or wherein two groups selected from each $L^1$, $L^2$, $R^1$ and $R^2$ together represent the necessary atoms to form a cyclic structure.

In accordance with another preferred embodiment of the present invention, the N-imide group Q has the following formula

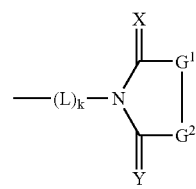

wherein $G^1$ and $G^2$ are independently selected from O, S, $NR^3$ or $CR^4R^5$, with the limitation that $G^1$ is not O or S when $G^2$ is O and that $G^1$ is not O or S when $G^2$ is $NR^3$, wherein $R^4$ and $R^5$ are independently selected from hydrogen, an optionally substituted alkyl, alkenyl, alkynyl, cycloalkyl, heterocyclic, aryl, heteroaryl, aralkyl or heteroaralkyl group or -$L^3$-$R^6$, wherein $L^3$ is a linking group, wherein $R^3$ and $R^6$ are independently selected from hydrogen or an optionally substituted alkyl, alkenyl, alkynyl, cycloalkyl, heterocyclic, aryl, heteroaryl, aralkyl or heteroaralkyl group, or wherein two groups selected from each $R^3$, $R^4$, $R^5$, $R^6$ and $L^3$ together represent the necessary atoms to form a cyclic structure.

In accordance with another preferred embodiment of the present invention, the N-imide group Q has the following formula

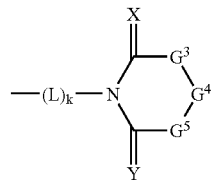

wherein $G^3$ to $G^5$ are independently selected from O, S, $NR^7$ or $CR^8R^9$, with the limitation that at least one group, selected from $G^3$ to $G^5$, is $CR^8R^9$ and that two neighbouring groups, selected from $G^3$ to $G^5$, are not represented by O and S, by O and $NR^7$, by S and $NR^7$ or by O and O, or wherein $G^4$ is a linking group, wherein $R^8$ and $R^9$ are independently selected from hydrogen, an optionally substituted alkyl, alkenyl, alkynyl, cycloalkyl, heterocyclic, aryl, heteroaryl, aralkyl or heteroaralkyl group or $-L^4-R^{10}$, wherein $L^4$ is a linking group, wherein $R^7$ and $R^{10}$ are independently selected from hydrogen or an optionally substituted alkyl, alkenyl, alkynyl, cycloalkyl, heterocyclic, aryl, heteroaryl, aralkyl or heteroaralkyl group, or wherein two groups selected from each $R^7$, $R^8$, $R^9$, $R^{10}$ and $L^4$ together represent the necessary atoms to form a cyclic structure.

In accordance with another preferred embodiment of the present invention, the N-imide group Q has the following formula

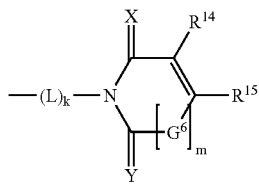

wherein $G^6$ is a group selected from O, S, $NR^{11}$ or $CR^{12}R^{13}$, wherein m is 0 or 1, wherein $R^{12}$ to $R^{15}$ are independently selected from hydrogen, an optionally substituted alkyl, alkenyl, alkynyl, cycloalkyl, heterocyclic, aryl, heteroaryl, aralkyl or heteroaralkyl group or $-L^5-R^{16}$, wherein $L^5$ is a linking group, wherein $R^{11}$ and $R^{16}$ are independently selected from hydrogen or an optionally substituted alkyl, alkenyl, alkynyl, cycloalkyl, heterocyclic, aryl, heteroaryl, aralkyl or heteroaralkyl group, or wherein two groups selected from each $R^{11}$, $R^{12}$, $R^{13}$, $R^{14}$, $R^{15}$, $R^{16}$ and $L^5$ together represent the necessary atoms to form a cyclic structure.

In accordance with another preferred embodiment of the present invention, the N-imide group Q has the following formula

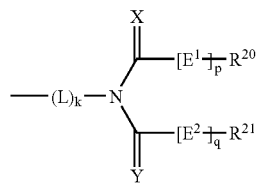

wherein $E^1$ and $E^2$ are independently selected from O, S, $NR^{17}$ or $CR^{18}R^{19}$, wherein p and q are independently 0 or 1, wherein $R^{18}$ to $R^{21}$ are independently selected from hydrogen, an optionally substituted alkyl, alkenyl, alkynyl, cycloalkyl, heterocyclic, aryl, heteroaryl, aralkyl or heteroaralkyl group or $-L^6-R^{22}$, wherein $L^6$ is a linking group, wherein $R^{17}$ and $R^{22}$ are independently selected from hydrogen or an optionally substituted alkyl, alkenyl, alkynyl, cycloalkyl, heterocyclic, aryl, heteroaryl, aralkyl or heteroaralkyl group.

In accordance with another preferred embodiment of the present invention, the N-imide group Q has one of the following formula:

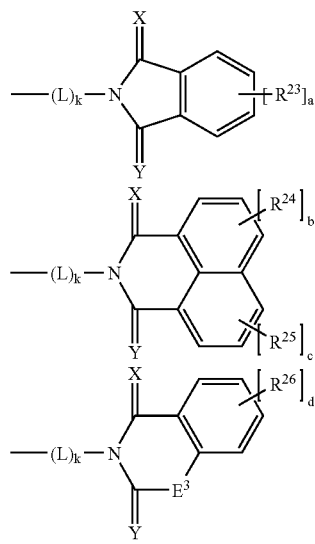

wherein each $R^{23}$ to $R^{26}$ are independently selected from hydrogen, an optionally substituted alkyl, alkenyl, alkynyl, cycloalkyl, heterocyclic, aryl, heteroaryl, aralkyl or heteroaralkyl group, halogen, $-SO_2-NH-R^{27}$, $-NH-SO_2-R^{30}$, $-CO-NR^{27}-R^{28}$, $-NR^{27}-CO-R^{30}$, $-NR^{27}-CO-NR^{28}-R^{29}$, $-NR^{27}-CS-NR^{28}-R^{29}$, $-NR^{27}-CO-O-R^{28}$, $-O-CO-NR^{27}-R^{28}$, $-O-CO-R^{30}$, $-CO-O-R^{27}$, $-CO-R^{27}$, $-SO_3-R^{27}$, $-O-SO_2-R^{30}$, $-SO_2-R^{27}$, $-SO-R^{30}$, $-P(=O)(-O-R^{27})(-O-R^{28})$, $-O-P(=O)(-O-R^{27})(-O-R^{28})$, $-NR^{27}-R^{28}$, $-O-R^{27}$, $-S-R^{27}$, $-CN$, $-NO_2$, $-N(-CO-R^{27})(-CO-R^{28})$, $-N$-phthalimidyl, $-M-N$-phthalimidyl, or $-M-R^{27}$, wherein M represents a divalent linking group containing 1 to 8 carbon atoms, wherein $R^{27}$ to $R^{29}$ are independently selected from hydrogen or an optionally substituted alkyl, alkenyl, alkynyl, cycloalkyl, heterocyclic, aryl, heteroaryl, aralkyl or heteroaralkyl group, wherein $R^{30}$ is selected from an optionally substituted alkyl, alkenyl, alkynyl, cycloalkyl, heterocyclic, aryl, heteroaryl, aralkyl or heteroaralkyl group, wherein a and d are independently 0, 1, 2, 3 or 4, wherein b and c are independently 0, 1, 2 or 3, wherein $E^3$ is selected from O, S, $NR^{31}$ or $CR^{32}R^{33}$, wherein $R^{32}$ and $R^{33}$ are independently selected from hydrogen, an optionally substituted alkyl, alkenyl, alkynyl, cycloalkyl, heterocyclic, aryl, heteroaryl, aralkyl or heteroaralkyl group or $-L^7-R^{34}$, wherein $L^7$ is a linking group, wherein $R^{31}$ and $R^{34}$ are independently selected from hydrogen or an optionally substituted alkyl, alkenyl, alkynyl, cycloalkyl, heterocyclic, aryl, heteroaryl, aralkyl or heteroaralkyl group.

In accordance with another preferred embodiment of the present invention, the N-imide group Q has one of the following formula:

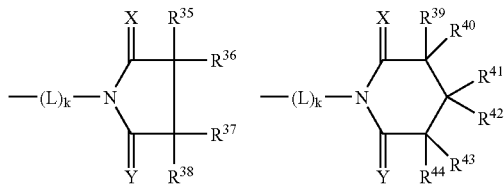

wherein $R^{35}$ to $R^{44}$ are independently selected from hydrogen, an optionally substituted alkyl, alkenyl, alkynyl, cycloalkyl, heterocyclic, aryl, heteroaryl, aralkyl or heteroaralkyl group, halogen, —SO₂—NH—$R^{45}$, —NH—SO₂—$R^{48}$, —CO—N$R^{45}$—$R^{46}$, —N$R^{45}$CO—$R^{48}$, —N$R^{45}$—CO—N$R^{46}$—$R^{47}$, —N$R^{45}$—N$R^{46}$—$R^{47}$—N$R^{45}$—CO—O—$R^{46}$, —O—CO—N$R^{45}$—$R^{46}$, —O—CO—$R^{48}$, —CO—O—$R^{45}$, —CO—$R^{45}$, —SO₃—$R^{45}$, —O—SO₂—$R^{48}$, SO₂$R^{45}$, —SO—$R^{48}$, —P(=O)(—O—$R^{45}$)(—O—$R^{46}$), —O—P(=O)(—O—$R^{45}$)(—O—$R^{46}$), —N$R^{45}$—$R^{46}$, —O—$R^{45}$, —S—$R^{45}$, —CN, —N(—CO—$R^{45}$)(—CO—$R^{46}$, —N-phthalimidyl, -M-N-phthalimidyl, or -M-$R^{45}$, wherein M represents a divalent linking group containing 1 to 8 carbon atoms, wherein $R^{45}$ to $R^{47}$ are independently selected from hydrogen or an optionally substituted alkyl, alkenyl, alkynyl, cycloalkyl, heterocyclic, aryl, heteroaryl, aralkyl or heteroaralkyl group, wherein $R^{48}$ is selected from an optionally substituted alkyl, alkenyl, alkynyl, cycloalkyl, heterocyclic, aryl, heteroaryl, aralkyl or heteroaralkyl group.

In accordance with another preferred embodiment of the present invention, the N-imide group Q has one of the following formula:

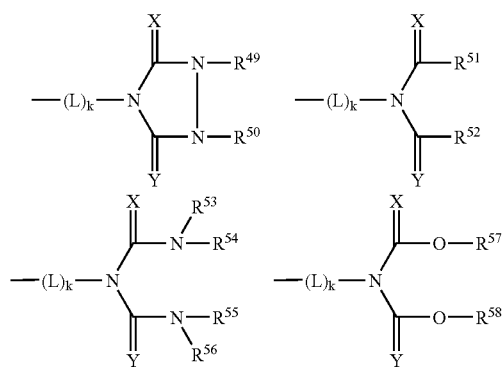

wherein $R^{49}$ to $R^{56}$ are independently selected from hydrogen or an optionally substituted alkyl, alkenyl, alkynyl, cycloalkyl, heterocyclic, aryl, heteroaryl, aralkyl or heteroaralkyl group, and wherein $R^{57}$ and $R^{58}$ are independently selected from an optionally substituted alkyl, alkenyl, alkynyl, cycloalkyl, heterocyclic, aryl, heteroaryl, aralkyl or heteroaralkyl group.

In accordance with another preferred embodiment of the present invention, the N-imide group Q has one of the following formula:

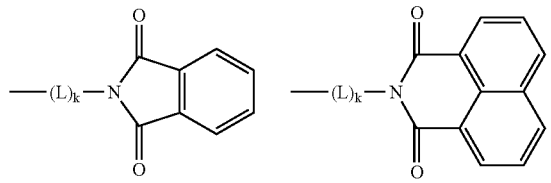

Examples of linking groups may be selected from —CO—, —CO—O—, —CS—, —CO—N$R^a$—, —SO—, —SO₂—, —SO₃—, —SO₂—NH—, —(C$R^a R^b$)$_t$—, an alkylene such as —CH₂—, —CH₂—CH₂—, —CH₂—(CH₂)$_n$—CH₂—, an arylene such as phenylene or naphtalene, a divalent heterocyclic group or suitable combinations thereof. Herein represent n and t an integer between 1 and 8 and represent $R^a$ and $R^b$ a group selected from hydrogen or an optionally substituted alkyl, alkenyl, alkynyl, cycloalkyl, heterocyclic, aryl, heteroaryl, aralkyl or heteroaralkyl group.

The polymers of this invention can be obtained via several routes, e.g. by reaction of a reactive compound comprising a N-imide group with a hydroxy group of a polymer containing a phenolic monomeric unit. The polymers of this invention can also be obtained by reaction of a reactive compound comprising a N-imide group with the hydroxy group a phenolic monomer and subsequently polymerising or polycondensating this reacted monomer. These pre-modified monomers can preferentially be copolymerised or copolycondensated with other monomers.

Such a "reactive compound comprising a N-imide group", herein after also referred to as a "substituting reagens", is a compound which comprises beside a N-imide group a functional group, capable of reacting with a hydroxy group of a phenolic unit, or a precursor therefor. Examples of a functional group or a precursor, suitable for this substitution reaction on the hydroxy group, are an acid, an acid anhydride, an acid halogenide, a halide or an isocyanate.

Examples of substituting reagentia, which can be used for this substitution reaction, are:

SR-01: N-(bromo-methyl)-phthalimide
SR-02: N-(chloro-methyl)-phthalimide

SR-03:

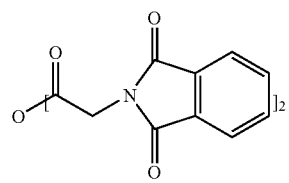

SR-04:

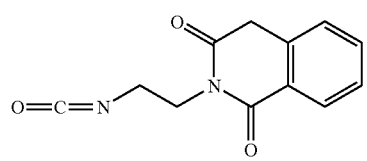

SR-05:

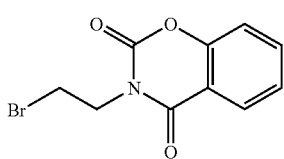

SR-06:

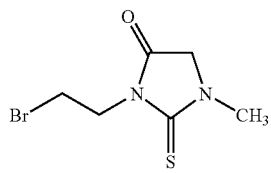

SR-07:

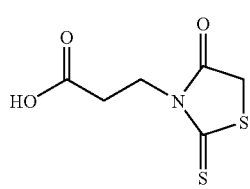

Polymers containing phenolic monomeric units can be a random, an alternating, a block or graft copolymer of different monomers and may be selected from e.g. polymers or copolymers of vinylphenol, novolac resins or resol resins. A novolac resin is preferred.

The novolac resin or resol resin may be prepared by polycondensation of at least one member selected from aromatic hydrocarbons such as phenol, o-cresol, p-cresol, m-cresol, 2,5-xylenol, 3,5-xylenol, resorcinol, pyrogallol, bisphenol, bisphenol A, trisphenol, o-ethylphenol, p-etylphenol, propylphenol, n-butylphenol, t-butylphenol, 1-naphtol and 2-naphtol, with at least one aldehyde or ketone selected from aldehydes such as formaldehyde, glyoxal, acetoaldehyde, propionaldehyde, benzaldehyde and furfural and ketones such as acetone, methyl ethyl ketone and methyl isobutyl ketone, in the presence of an acid catalyst. Instead of formaldehyde and acetaldehyde, paraformaldehyde and paraldehyde may, respectively, be used.

The weight average molecular weight, measured by gel permeation chromatography using universal calibration and polystyrene standards, of the novolac resin is preferably from 500 to 150,000 g/mol, more preferably from 1,500 to 15,000 g/mol.

The poly(vinylphenol) resin may also be a polymer of one or more hydroxy-phenyl containing monomers such as hydroxystyrenes or hydroxy-phenyl (meth)acrylates. Examples of such hydroxystyrenes are o-hydroxystyrene, m-hydroxystyrene, p-hydroxystyrene, 2-(o-hydroxyphenyl) propylene, 2-(m-hydroxyphenyl)propylene and 2-(p-hydroxyphenyl) propylene. Such a hydroxystyrene may have a substituent such as chlorine, bromine, iodine, fluorine or a $C_{1-4}$ alkyl group, on its aromatic ring. An example of such hydroxy-phenyl (meth)acrylate is 2-hydroxy-phenyl methacrylate.

The poly(vinylphenol) resin may usually be prepared by polymerizing one or more hydroxy-phenyl containing monomer in the presence of a radical initiator or a cationic polymerization initiator. The poly(vinylphenol) resin may also be prepared by copolymerizing one or more of these hydroxy-phenyl containing monomers with other monomeric compounds such as acrylate monomers, methacrylate monomers, acrylamide monomers, methacrylamide monomers, vinyl monomers, aromatic vinyl monomers or diene monomers.

The weight average molecular weight, measured by gel permeation chromatography using universal calibration and polystyrene standards, of the poly(vinylphenol) resin is preferably from 1.000 to 200,000 g/mol, more preferably from 1,500 to 50,000 g/mol.

Examples of polymers containing phenolic monomeric units which can be modified with a substituting reagents are:

| | |
|---|---|
| POL-01: | ALNOVOL SPN452 is a solution of a novolac resin, 40% by weight in Dowanol PM, obtained from CLARIANT GmbH. Dowanol PM consists of 1-methoxy-2-propanol (>99.5%) and 2-methoxy-1-propanol (<0.5%). |
| POL-02: | ALNOVOL SPN400 is a solution of a novolac resin, 44% by weight in Dowanol PMA, obtained from CLARIANT GmbH. Dowanol PMA consists of 2-methoxy-1-methyl-ethylacetate. |
| POL-03: | ALNOVOL HPN100 a novolac resin obtained from CLARIANT GmbH. |
| POL-04: | DURITE PD443 is a novolac resin obtained from BORDEN CHEM. INC. |
| POL-05: | DURITE SD423A is a novolac resin obtained from BORDEN CHEM. INC. |
| POL-06: | DURITE SD126A is a novolac resin obtained from BORDEN CHEM. INC. |
| POL-07: | BAKELITE 6866LB02 is a novolac resin obtained from BAKELITE AG. |
| POL-08: | BAKELITE 6866LB03 is a novolac resin obtained from BAKELITE AG. |
| POL-09: | KR 400/8 is a novolac resin obtained from KOYO CHEMICALS INC. |
| POL-10: | HRJ 1085 is a novolac resin obtained from SCHNECTADY INTERNATIONAL INC. |
| POL-11: | HRJ 2606 is a phenol novolac resin obtained from SCHNECTADY INTERNATIONAL INC. |
| POL-12: | LYNCUR CMM is a copolymer of 4-hydroxy-styrene and methyl methacrylate obtained from SIBER HEGNER. |

The polymer of the present invention may contain more than one type of a N-imide group. In this situation each type of N-imide group can be incorporated successively, or a mixture of different substituting reagentia can be reacted with the polymer. The preferred amount of each type of N-imide group incorporated in the polymer is between 0.5 mol % and 80 mol %, more preferably between 1 mol % and 50 mol %, most preferably 2 mol % and 30 mol %.

According to another aspect of the present invention, the above polymer is used in the coating of a lithographic printing plate precursor. According to one embodiment, the printing plate precursor is positive-working, i.e. after exposure and development the exposed areas of the oleophilic layer are removed from the support and define hydrophilic, non-image (non-printing) areas, whereas the unexposed layer is not removed from the support and defines an oleophilic image (printing) area. According to another embodiment, the printing plate precursor is negative-working, i.e. the image areas correspond to the exposed areas.

Other polymers, such as unmodified phenolic resins or phenolic resins with another modification than described in the present invention, can also be added to the coating composition. The polymer of the present invention is preferably added to the coating in a concentration range of 5% by weight to 98% by weight of the total coating, more preferably between 10% by weight to 95% by weight.

If the heat-sensitive coating is composed of more than one layer, the polymer of the present invention is present in at least one of these layers, e.g. in a top-layer. The polymer can also be present in more than one layer of the coating, e.g. in a top-layer and in an intermediate layer.

The support has a hydrophilic surface or is provided with a hydrophilic layer. The support may be a sheet-like material such as a plate or it may be a cylindrical element such as a sleeve which can be slid around a print cylinder of a printing press. Preferably, the support is a metal support such as aluminum or stainless steel.

A particularly preferred lithographic support is an electrochemically grained and anodized aluminum support.

Graining and anodizing of aluminum lithographic supports is well known. The grained aluminum support used in the material of the present invention is preferably an electrochemically grained support. The acid used for graining can be e.g. nitric acid. The acid used for graining preferably comprises hydrogen chloride. Also mixtures of e.g. hydrogen chloride and acetic acid can be used.

The grained and anodized aluminum support may be post-treated to improve the hydrophilic properties of its surface. For example, the aluminum support may be silicated by treating its surface with a sodium silicate solution at elevated temperature, e.g. 95° C. Alternatively, a phosphate treatment may be applied which involves treating the aluminum oxide surface with a phosphate solution that may further contain an inorganic fluoride. Further, the aluminum oxide surface may be rinsed with an organic acid and/or salt thereof, e.g. carboxylic acids, hydroxycarboxylic acids, sulfonic acids or phosphonic acids, or their salts, e.g. succinates, phosphates, phosphonates, sulfates, and sulfonates. A citric acid or citrate solution is preferred. This treatment may be carried out at room temperature or may be carried out at a slightly elevated temperature of about 30 to 50° C. A further post-treatment involves rinsing the aluminum oxide surface with a bicarbonate solution. Still further, the aluminum oxide surface may be treated with polyvinylphosphonic acid, polyvinylmethylphosphonic acid, phosphoric acid esters of polyvinyl alcohol, polyvinylsulfonic acid, polyvinylbenzenesulfonic acid, sulfuric acid esters of polyvinyl alcohol, and acetals of polyvinyl alcohols formed by reaction with a sulfonated aliphatic aldehyde. It is further evident that one or more of these post-treatments may be carried out alone or in combination. More detailed descriptions of these treatments are given in GB-A-1 084 070, DE-A-4 423 140, DE-A-4 417 907, EP-A-659 909, EP-A-537 633, DE-A-4 001 466, EP-A-292 801, EP-A-291 760 and U.S. Pat. No. 4,458,005.

According to another embodiment, the support can also be a flexible support, which is provided with a hydrophilic layer, hereinafter called 'base layer'. The flexible support is e.g. paper, plastic film, thin aluminum or a laminate thereof. Preferred examples of plastic film are polyethylene terephthalate film, polyethylene naphthalate film, cellulose acetate film, polystyrene film, polycarbonate film, etc. The plastic film support may be opaque or transparent.

The base layer is preferably a cross-linked hydrophilic layer obtained from a hydrophilic binder cross-linked with a hardening agent such as formaldehyde, glyoxal, polyisocyanate or a hydrolyzed tetra-alkylorthosilicate. The latter is particularly preferred. The thickness of the hydrophilic base layer may vary in the range of 0.2 to 25 μm and is preferably 1 to 10 μm.

The hydrophilic binder for use in the base layer is e.g. a hydrophilic (co)polymer such as homopolymers and copolymers of vinyl alcohol, acrylamide, methylol acrylamide, methylol methacrylamide, acrylic acid, methacrylic acid, hydroxyethyl acrylate, hydroxyethyl methacrylate or maleic anhydride/vinylmethylether copolymers. The hydrophilicity of the (co)polymer or (co)polymer mixture used is preferably the same as or higher than the hydrophilicity of polyvinyl acetate hydrolyzed to at least an extent of 60% by weight, preferably 80% by weight.

The amount of hardening agent, in particular tetraalkyl orthosilicate, is preferably at least 0.2 parts per part by weight of hydrophilic binder, more preferably between 0.5 and 5 parts by weight, most preferably between 1 parts and 3 parts by weight.

The hydrophilic base layer may also contain substances that increase the mechanical strength and the porosity of the layer. For this purpose colloidal silica may be used. The colloidal silica employed may be in the form of any commercially available water dispersion of colloidal silica for example having an average particle size up to 40 nm, e.g. 20 nm. In addition inert particles of larger size than the colloidal silica may be added e.g. silica prepared according to Stöber as described in J. Colloid and Interface Sci., Vol. 26, 1968, pages 62 to 69 or alumina particles or particles having an average diameter of at least 100 nm which are particles of titanium dioxide or other heavy metal oxides. By incorporating these particles the surface of the hydrophilic base layer is given a uniform rough texture consisting of microscopic hills and valleys, which serve as storage places for water in background areas.

Particular examples of suitable hydrophilic base layers for use in accordance with the present invention are disclosed in EP-A-601 240, GB-P-1 419 512, FR-P-2 300 354, U.S. Pat. No. 3,971,660, and U.S. Pat. No. 4,284,705.

It is particularly preferred to use a film support to which an adhesion improving layer, also called support layer, has been provided. Particularly suitable adhesion improving layers for use in accordance with the present invention comprise a hydrophilic binder and colloidal silica as disclosed in EP-A-619 524, EP-A-620 502 and EP-A-619 525. Preferably, the amount of silica in the adhesion improving layer is between 200 mg/m$^2$ and 750 mg/m$^2$. Further, the ratio of silica to hydrophilic binder is preferably more than 1 and the surface area of the colloidal silica is preferably at least 300 m$^2$/gram, more preferably at least 500 m$^2$/gram.

The coating provided on the support is heat-sensitive and can preferably be handled in normal working lighting conditions (daylight, fluorescent light) for several hours. The coating preferably does not contain UV-sensitive compounds which have an absorption maximum in the wavelength range of 200 nm to 400 nm such as diazo compounds, photoacids, photoinitiators, quinone diazides, or sensitizers. Preferably the coating neither contains compounds which have an absorption maximum in the blue and green visible light wavelength range between 400 and 600 nm.

The coating may comprise one or more distinct layers. Besides the layers discussed hereafter, the coating may further comprise e.g. a "subbing" layer which improves the adhesion of the coating to the support, a covering layer which protects the coating against contamination or mechanical damage, and/or a light-to-heat conversion layer which comprises an infrared light absorbing compound.

A suitable negative-working alkaline developing printing plate comprises a phenolic resin and a latent Brönsted acid which produces acid upon heating or IR radiation. These acids catalyze crosslinking of the coating in a post-exposure heating step and thus hardening of the exposed regions. Accordingly, the non-exposed regions can be washed away by a developer to reveal the hydrophilic substrate underneath. For a more detailed description of such a negative-working printing plate precursor we refer to U.S. Pat. No. 6,255,042 and U.S. Pat. No. 6,063,544 and to references cited in these documents. In such a negative-working lithographic printing plate precursor, the polymer of the present invention is added to the coating composition and replaces at least part of the phenolic resin.

In a positive-working lithographic printing plate precursor, the coating is capable of heat-induced solubilization, i.e. the coating is resistant to the developer and ink-accepting in the non-exposed state and becomes soluble in the developer upon exposure to heat or infrared light to such an extent that the hydrophilic surface of the support is revealed thereby.

Besides the polymer of the present invention, the coating may contain additional polymeric binders that are soluble in an aqueous alkaline developer. Preferred polymers are phenolic resins, e.g. novolac, resoles, polyvinyl phenols and carboxy-substituted polymers. Typical examples of such polymers are described in DE-A-4007428, DE-A-4027301 and DE-A-4445820.

In a preferred positive-working lithographic printing plate precursor, the coating also contains one or more dissolution inhibitors. Dissolution inhibitors are compounds which reduce the dissolution rate of the hydrophobic polymer in the aqueous alkaline developer at the non-exposed areas of the coating and wherein this reduction of the dissolution rate is destroyed by the heat generated during the exposure so that the coating readily dissolves in the developer at exposed areas. The dissolution inhibitor exhibits a substantial latitude in dissolution rate between the exposed and non-exposed areas. By preference, the dissolution inhibitor has a good dissolution rate latitude when the exposed coating areas have dissolved completely in the developer before the non-exposed areas are attacked by the developer to such an extent that the ink-accepting capability of the coating is affected. The dissolution inhibitor(s) can be added to the layer which comprises the hydrophobic polymer discussed above.

The dissolution rate of the non-exposed coating in the developer is preferably reduced by interaction between the hydrophobic polymer and the inhibitor, due to e.g. hydrogen bonding between these compounds. Suitable dissolution inhibitors are preferably organic compounds which comprise at least one aromatic group and a hydrogen bonding site, e.g. a carbonyl group, a sulfonyl group, or a nitrogen atom which may be quaternized and which may be part of a heterocyclic ring or which may be part of an amino substituent of said organic compound. Suitable dissolution inhibitors of this type have been disclosed in e.g. EP-A 825927 and 823327.

Water-repellent polymers represent an another type of suitable dissolution inhibitors. Such polymers seem to increase the developer resistance of the coating by repelling the aqueous developer from the coating. The water-repellent polymers can be added to the layer comprising the hydrophobic polymer and/or can be present in a separate layer provided on top of the layer with the hydrophobic polymer. In the latter embodiment, the water-repellent polymer forms a barrier layer which shields the coating from the developer and the solubility of the barrier layer in the developer or the penetrability of the barrier layer by the developer can be increased by exposure to heat or infrared light, as described in e.g. EP-A 864420, EP-A 950517 and WO99/21725. Preferred examples of the water-repellent polymers are polymers comprising siloxane and/or perfluoroalkyl units. In one embodiment, the coating contains such a water-repellent polymer in an amount between 0.5 and 25 mg/m$^2$, preferably between 0.5 and 15 mg/m$^2$ and most preferably between 0.5 and 10 mg/m$^2$. When the water-repellent polymer is also ink-repelling, e.g. in the case of polysiloxanes, higher amounts than 25 mg/m$^2$ can result in poor ink-acceptance of the non-exposed areas. An amount lower than 0.5 mg/m$^2$ on the other hand may lead to an unsatisfactory development resistance. The polysiloxane may be a linear, cyclic or complex cross-linked polymer or copolymer. The term polysiloxane compound shall include any compound which contains more than one siloxane group —Si(R,R')—O—, wherein R and R' are optionally substituted alkyl or aryl groups. Preferred siloxanes are phenylalkylsiloxanes and dialkylsiloxanes. The number of siloxane groups in the (co)polymer is at least 2, preferably at least 10, more preferably at least 20. It may be less than 100, preferably less than 60. In another embodiment, the water-repellent polymer is a block-copolymer or a graft-copolymer of a poly (alkylene oxide) block and a block of a polymer comprising siloxane and/or perfluoroalkyl units. A suitable copolymer comprises about 15 to 25 siloxane units and 50 to 70 alkylene oxide groups. Preferred examples include copolymers comprising phenylmethylsiloxane and/or dimethylsiloxane as well as ethylene oxide and/or propylene oxide, such as Tego Glide 410, Tego Wet 265, Tego Protect 5001 or Silikophen P50/X, all commercially available from Tego Chemie, Essen, Germany. Such a copolymer acts as a surfactant which upon coating, due to its bifunctional structure, automatically positions itself at the interface between the coating and air and thereby forms a separate top layer even when the whole coating is applied from a single coating solution. Simultaneously, such surfactants act as a spreading agent which improves the coating quality. Alternatively, the water-repellent polymer can be applied in a second solution, coated on top of the layer comprising the hydrophobic polymer. In that embodiment, it may be advantageous to use a solvent in the second coating solution that is not capable of dissolving the ingredients present in the first layer so that a highly concentrated water-repellent phase is obtained at the top of the coating.

Preferably, also one or more development accelerators are included in the coating, i.e. compounds which act as dissolution promoters because they are capable of increasing the dissolution rate of the non-exposed coating in the developer. The simultaneous application of dissolution inhibitors and accelerators allows a precise fine tuning of the dissolution behavior of the coating. Suitable dissolution accelerators are cyclic acid anhydrides, phenols or organic acids. Examples of the cyclic acid anhydride include phthalic anhydride, tetrahydrophthalic anhydride, hexahydrophthalic anhydride, tetrachlorophthalic anhydride, maleic anhydride, chloromaleic anhydride, alpha-phenylmaleic anhydride, succinic anhydride, and pyromellitic anhydride, as described in U.S. Pat. No. 4,115,128. Examples of the phenols include bisphenol A, p-nitrophenol, p-ethoxyphenol, 2,4,4'-trihydroxybenzophenone, 2,3,4-trihydroxy-benzophenone, 4-hydroxybenzophenone, 4,4',4"-trihydroxy-triphenylmethane, and 4,4',3",4"-tetrahydroxy-3,5,3',5'-tetramethyltriphenyl-methane, and the like. Examples of the organic acids include sulfonic acids, sulfinic acids, alkylsulfuric acids, phosphonic acids, phosphates, and carboxylic acids, as described in, for example, JP-A Nos. 60-88,942 and 2-96,755. Specific examples of these organic acids include p-toluenesulfonic acid, dodecylbenzenesulfonic acid, p-toluenesulfinic acid, ethylsulfuric acid, phenylphosphonic acid, phenylphosphinic acid, phenyl phosphate, diphenyl phosphate, benzoic acid, isophthalic acid, adipic acid, p-toluic acid, 3,4-dimethoxybenzoic acid, phthalic acid, terephthalic acid, 4-cyclohexene-1,2-dicarboxylic acid, erucic acid, lauric acid, n-undecanoic acid, and ascorbic acid. The amount of the cyclic acid anhydride, phenol, or organic acid contained in the coating is preferably in the range of 0.05 to 20% by weight, relative to the coating as a whole.

The polymer of the present invention can be used in conventional photosensitive printing plate precursors wherein at least part of the conventional phenolic polymer is replaced by at least one of the polymers of the present invention.

According to a more preferred embodiment, the material of the present invention is image-wise exposed to infrared light, which is converted into heat by an infrared light absorbing agent, which may be a dye or pigment having an absorption maximum in the infrared wavelength range. The concentration of the sensitizing dye or pigment in the coating is typically between 0.25 and 10.0 wt. %, more preferably between 0.5 and 7.5 wt. % relative to the coating as a whole. Preferred IR-absorbing compounds are dyes such as cyanine or merocyanine dyes or pigments such as carbon black. A suitable compound is the following infrared dye:

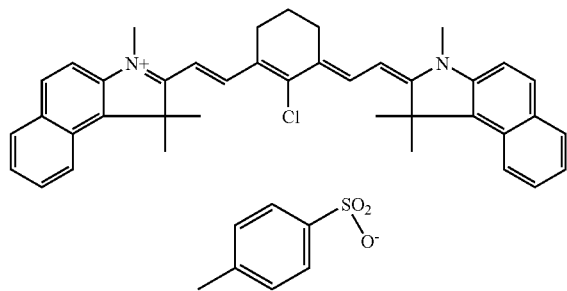

IR-1

The coating may further contain an organic dye which absorbs visible light so that a perceptible image is obtained upon image-wise exposure and subsequent development. Such a dye is often called contrast dye or indicator dye. Preferably, the dye has a blue color and an absorption maximum in the wavelength range between 600 nm and 750 nm. Although the dye absorbs visible light, it preferably does not sensitize the printing plate precursor, i.e. the coating does not become more soluble in the developer upon exposure to visible light. Suitable examples of such a contrast dye are the quaternized triarylmethane dyes. Another suitable compound is the following dye:

embodiment, the infrared light absorbing compound is concentrated in or near the barrier layer, e.g. in an intermediate layer between the layer comprising the hydrophobic polymer and the barrier layer.

The printing plate precursor of the present invention can be exposed to infrared light with LEDs or a laser. Preferably, a laser emitting near infrared light having a wavelength in the range from about 750 to about 1500 nm is used, such as a semiconductor laser diode, a Nd:YAG or a Nd:YLF laser. The required laser power depends on the sensitivity of the image-recording layer, the pixel dwell time of the laser beam, which is determined by the spot diameter (typical value of modern plate-setters at $1/e^2$ of maximum intensity: 10-25 μm), the scan speed and the resolution of the exposure apparatus (i.e. the number of addressable pixels per unit of linear distance, often expressed in dots per inch or dpi; typical value: 1000-4000 dpi).

Two types of laser-exposure apparatuses are commonly used: internal (ITD) and external drum (XTD) plate-setters. ITD plate-setters for thermal plates are typically characterized by a very high scan speed up to 1500 m/sec and may require a laser power of several Watts. The Agfa Galileo T is a typical example of a plate-setter using the ITD-technology. XTD plate-setters operate at a lower scan speed typically from 0.1 m/sec to 10 m/sec and have a typical laser-output-power per beam from 20 mW up to 500 mW. The Creo Trendsetter plate-setter family and the Agfa Excalibur plate-setter family both make use of the XTD-technology.

The known plate-setters can be used as an off-press exposure apparatus, which offers the benefit of reduced press down-time. XTD plate-setter configurations can also be used for on-press exposure, offering the benefit of immediate registration in a multi-color press. More technical details of on-press exposure apparatuses are described in e.g. U.S. Pat. No. 5,174,205 and U.S. Pat. No. 5,163,368.

In the development step, the non-image areas of the coating can be removed by immersion in an aqueous alkaline developer, which may be combined with mechanical rubbing, e.g.

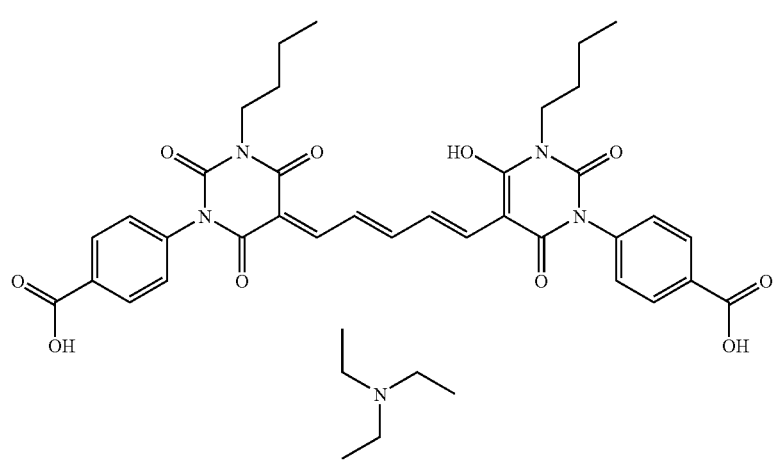

CD-1

The infrared light absorbing compound and the contrast dye may be present in the layer comprising the hydrophobic polymer, and/or in the barrier layer discussed above and/or in an optional other layer. According to a highly preferred by a rotating brush. The developer preferably has a pH above 10, more preferably above 12. The development step may be followed by a rinsing step, a gumming step, a drying step and/or a post-baking step.

The printing plate thus obtained can be used for conventional, so-called wet offset printing, in which ink and an aqueous dampening liquid is supplied to the plate. Another suitable printing method uses so-called single-fluid ink without a dampening liquid. Single-fluid ink consists of an ink phase, also called the hydrophobic or oleophilic phase, and a polar phase which replaces the aqueous dampening liquid that is used in conventional wet offset printing. Suitable examples of single-fluid inks have been described in U.S. Pat. No. 4,045,232; U.S. Pat. No. 4,981,517 and U.S. Pat. No. 6,140,392. In a most preferred embodiment, the single-fluid ink comprises an ink phase and a polyol phase as described in WO 00/32705.

EXAMPLES

List of substitution reagents used in the preparation of modified polymers:

| | |
|---|---|
| CSR-01: | benzylbromide, |
| CSR-02: | benzoylchloride, |
| CSR-03: | di-tert.-butyl dicarbonate, |
| CSR-04: | acetylchloride. |

Preparation of Polymer MP-01:

Modifying Solution:

A mixture of 4.32 g SR-01 and 20 ml N,N-dimethylacetamide was stirred at room temperature until the amount of added SR-01 was dissolved.

Phenolic Polymer Solution:

A mixture of 55 g of POL-01 solution (40% by weight) and 120 ml N,N-dimethylacetamide was stirred at room temperature. Then 1.0 g NaOH was added in small portions after which stirring was continued for another 30 minutes at room temperature.

Then the above prepared modifying solution was added within one minute to the phenolic polymer solution while continuously stirring. The reaction mixture was heated up to 50° C. and further stirred at 50° C. during 60 minutes. Then 100 ml methanol and 5 ml acetic acid were added to the reaction mixture while continuously stirring. The resulting mixture was then added to 2 liters ice-water over a 15 minute period while continuously stirring. The polymer precipitated from the aqueous medium and was isolated by filtration. The desired product was finally obtained by washing 3 times with 300 ml water and subsequent drying at 45° C.

Preparation of Polymer MP-02:

The preparation of polymer MP-02 was carried out in the same way as that of polymer MP-01 with the exception that 9.0 g SR-01 was dissolved in 30 ml N,N-dimethylacetamide and that 45.75 g of POL-01 solution (40% by weight), 110 ml N,N-dimethylacetamide and 1.95 g NaH were used instead of the quantities given in the preparation of polymer MP-01.

Preparation of Polymer MP-03:

The preparation of polymer MP-03 was carried out in the same way as that of polymer MP-01 with the exception that 1.2 g SR-01 was dissolved in 20 ml N,N-dimethylacetamide and that 61.25 g of POL-01 solution (40% by weight), 150 ml N,N-dimethylacetamide and 0.3 g NaH were used instead of the quantities given in the preparation of polymer MP-01.

Preparation of Polymer MP-04:

Phenolic Polymer Solution:

A mixture of 24.5 g of POL-03 and 120 ml N,N-dimethylacetamide was stirred at 35° C. until the polymer was dissolved. Then 2.4 g NaH was added in small portions after which stirring was continued for another 30 minutes at 45° C.

Then 9.8 g SR-02 and 0.1 g KI were added to the above prepared phenolic polymer solution while continuously stirring. The reaction mixture was heated up to 65° C. and further stirred at 65° C. during 120 minutes. The resulting mixture was then added to a solution of 2 liters ice-water and 5 ml acetic acid over a 15 minute period while continuously stirring. The polymer precipitated from the aqueous medium and was isolated by filtration. The desired product was finally obtained by washing 3 times with 300 ml water and subsequent drying at 45° C.

Preparation of Polymer MP-05:

Phenolic Polymer Solution:

A mixture of 153 g of POL-01 solution (40% by weight) and 400 ml acetone was stirred at room temperature until the polymer was dissolved. Then 0.2 g 4-dimethylaminopyridine was added after which stirring was continued for 5 minutes.

Then 10.9 g CSR-03 was added in small portions to the above prepared phenolic polymer solution while continuously stirring and the reaction mixture was further stirred overnight. The resulting mixture was then added to a solution of 2 liters ice-water and 5 ml acetic acid over a 30 minute period while continuously stirring. The polymer precipitated from the aqueous medium and was isolated by filtration. The desired product was finally obtained by washing 3 times with 300 ml of a mixture water/methanol (volume ratio: 7/3) and subsequent drying at 45° C.

Preparation of Polymer MP-06:

The preparation of polymer MP-06 was carried out in the same way as that of polymer MP-05 with the exception that 0.1 g 4-dimethylaminopyridine and 2.73 g CSR-03 were used instead of the quantities given in the preparation of polymer MP-05.

Preparation of Polymer MP-07:

Phenolic Polymer Solution:

A mixture of 153 g of POL-01 solution (40% by weight) and 500 ml N,N-dimethylacetamide was stirred at room temperature until the polymer was dissolved. Then 6.0 g NaOH, dissolved in 5 ml water, was added after which stirring was continued for another 15 minutes.

Then 5.95 g CSR-01 was added to the above prepared phenolic polymer solution while continuously stirring. The reaction mixture was heated up to 40° C. and further stirred at 40° C. during 60 minutes. The resulting mixture was then added to a solution of 2.5 liters ice-water and 10 ml acetic acid over a 30 minute period while continuously stirring. The polymer precipitated from the aqueous medium and was isolated by filtration. The desired product was finally obtained by washing 3 times with 300 ml water and subsequent drying at 45° C.

Preparation of Polymer MP-08:

Phenolic Polymer Solution:

A mixture of 153 g of POL-01 solution (40% by weight) and 400 ml acetone was stirred at room temperature until the polymer was dissolved. Then 7.0 ml triethylamine was added after which stirring was continued for another 10 minutes.

Then 7.0 g CSR-02 was added dropwise in 10 minutes to the above prepared phenolic polymer solution while continuously stirring. The reaction mixture was further stirred during 60 minutes. The resulting mixture was then added to a solution of 2 liters ice-water and 2 ml acetic acid over a 60 minute period while continuously stirring. The polymer precipitated from the aqueous medium and was isolated by filtration. The desired product was finally obtained by washing 3 times with 300 ml of a mixture water/methanol (volume ratio: 6/4) and subsequent drying at 45° C.

Preparation of Polymer MP-9:

Phenolic Polymer Solution:

A mixture of 55 g of POL-12, 300 ml acetone and 3.5 ml triethylamine was stirred at room temperature until the polymer was dissolved.

Then 1.85 g CSR-04 was added dropwise in 10 minutes to the above prepared phenolic polymer solution while continuously stirring. The reaction mixture was further stirred during 30 minutes. The resulting mixture was then added to 3 liters ice-water over a 30 minute period while continuously stirring. The polymer precipitated from the aqueous medium and was isolated by filtration. The desired product was finally obtained by washing 10 times with 100 ml water and subsequent drying at 45° C.

Test 1:

Preparation of the Coating:

A coating solution was prepared by mixing the following ingredients:

86.55 g Dowanol PM
464.64 g methyl ethyl ketone
101.28 g of a solution of the infrared dye IR-1 in a concentration of 2% by weight in Dowanol PM
144.70 g of a solution of the contrast dye CD-1 in a concentration of 1% by weight in Dowanol PM
159.14 g of a solution of Tego Glide 410 in a concentration of 1% by weight in Dowanol PM
159.14 g of a solution of a phenolic polymer, as listed in tables 1 to 3, in a concentration of 40% by weight in Dowanol PM
3.18 g of 3,4,5-trimethoxycinnamic acid.

The coating solution was coated on an electrochemically grained and anodised aluminium substrate at a wet thickness of 20 µm. The coating was dried for 1 minute at 130° C.

For measuring the chemical resistance 2 different solutions were selected:

Test solution 1: solution of isopropanol in a concentration of 50% by weight in water,
Test solution 2: ANCHOR AQUA AYDE, commercially available from ANCHOR.

The chemical resistance was tested by contacting a droplet of 40 µl of each test solution on different spots of the coating. After 3 minutes, the droplet was removed from the coating with a cotton pad. The attack on the coating due to each test solution was rated by visual inspection as follows:

0: no attack,
1: changed gloss of the coating's surface,
2: small attack of the coating (thickness is decreased),
3: heavy attack of the coating,
4: completely dissolved coating.

The higher the rating, the less is the chemical resistance of the coating. The results for the 2 test solutions on each coating are summarised in tables 1, 2 and 3. For each substitution degree of the polymers, namely 10 mol %, 25 mol % and 2.5 mol %, the results are grouped in Table 1, 2 and 3. The Tables contain also information about the type of the phenolic polymer used in the substitution reaction, the type of substitution reagents and the degree of substitution (in mol %) and the MP-number of the prepared polymer.

TABLE 1

| Example number | Type Phenolic Polymer | Type reagens | Degree subst. (mol %) | Prep. Polym. MP-nr. | TEST 1 Test solution 1 | TEST 1 Test solution 2 |
|---|---|---|---|---|---|---|
| Comparative example 1 | POL-01 | — | — | — | 4 | 4 |
| Example 1 | POL-01 | SR-01 | 10 | MP-01 | 0 | 1 |
| Comparative example 2 | POL-01 | CSR-01 | 10 | MP-07 | 4 | 4 |
| Comparative example 3 | POL-01 | CSR-02 | 10 | MP-08 | 3 | 4 |
| Comparative example 4 | POL-01 | CSR-03 | 10 | MP-05 | 4 | 4 |
| Comparative example 5 | POL-12 | — | — | — | 4 | 4 |
| Comparative example 6 | POL-12 | CSR-04 | 10 | MP-09 | 4 | 4 |

TABLE 2

| Example number | Type Phenolic Polymer | Type reagens | Degree subst. (mol %) | Prep. Polym. MP-nr. | TEST 1 Test solution 1 | TEST 1 Test solution 2 |
|---|---|---|---|---|---|---|
| Comparative example 1 | POL-01 | — | — | — | 4 | 4 |
| Example 2 | POL-01 | SR-01 | 25 | MP-02 | 1 | 0 |
| Comparative example 7 | POL-03 | — | — | — | 4 | 4 |
| Example 3 | POL-03 | SR-02 | 25 | MP-04 | 0 | 1 |

TABLE 3

| Example number | Type Phenolic Polymer | Type reagens | Degree subst. (mol %) | Prep. Polym. MP-nr. | TEST 1 Test solution 1 | TEST 1 Test solution 2 |
|---|---|---|---|---|---|---|
| Comparative example 1 | POL-01 | — | — | — | 4 | 4 |
| Example 4 | POL-01 | SR-01 | 2.5 | MP-03 | 2 | 2 |
| Comparative example 8 | POL-01 | CSR-03 | 2.5 | MP-06 | 4 | 4 |

Each table demonstrates that those polymers, modified according to the present invention, give rise to a significant increase of the chemical resistance of the coating compared with unmodified polymers and compared with polymers, modified for the same degree with another substitution reagents than those required for making a polymer according to the present invention.

Test 2:

Preparation of the Coating:

A coating solution was prepared by mixing the following ingredients:

313.45 g Dowanol PM
482.40 g methyl ethyl ketone
50.64 g of a solution of the infrared dye IR-1 in a concentration of 2% by weight in Dowanol PM
72.35 g of a solution of the contrast dye CD-1 in a concentration of 1% by weight in Dowanol PM
79.57 g of a solution of a phenolic polymer, as listed in Table 4 to 6, in a concentration of 40% by weight in Dowanol PM
1.59 g of 3,4,5-trimethoxycinnamic acid.

Half of the surface of an electrochemically grained and anodised aluminium substrate was coated with the above prepared solution at a wet thickness of 10 μm. The sample was dried for 1 minute at 130° C. and gummed with OZASOL RC515, commercially available from AGFA, in order to protect the non-coated part of the aluminium.

Printing:

The plate was mounted on a "ABDick 360" press using "K+E 800 Skinnex Black", commercially available from BASF, as ink and "Emerald Premium MXEH", commercially available from ANCHOR, as fountain. The run length was determined based on the maximum number of prints that could be printed without any significant sign of wear on the printing area. The run length test was stopped at 100,000 copies.

The run lengths are summarised in Tables 4, 5 and 6. For each substitution degree of the polymers, namely 10 mol %, 25 mol % and 2.5 mol %, the results are grouped in Table 4, 5 and 6. The tables contain also information about the type of the phenolic polymer used in the substitution reaction, the type of substitution reagents, the degree of substitution (in mol %) and the MP-number of prepared polymer.

TABLE 4

| Example number | Type Phenolic Polymer | Type reagens | Degree subst. (mol %) | Prep. Polym. MP-nr. | TEST 2 Printing Run Length |
|---|---|---|---|---|---|
| Comparative example 9 | POL-01 | — | — | — | 25 000 |
| Example 5 | POL-01 | SR-01 | 10 | MP-01 | 90 000 |
| Comparative example 10 | POL-01 | CSR-03 | 10 | MP-05 | 31 000 |

TABLE 5

| Example number | Type Phenolic Polymer | Type reagens | Degree subst. (mol %) | Prep. Polym. MP-nr. | TEST 2 Printing Run Length |
|---|---|---|---|---|---|
| Comparative example 9 | POL-01 | — | — | — | 25 000 |
| Example 6 | POL-01 | SR-01 | 25 | MP-02 | >100 000 |
| Example 7 | POL-03 | SR-02 | 25 | MP-04 | >100 000 |

TABLE 6

| Example number | Type Phenolic Polymer | Type reagens | Degree subst. (mol %) | Prep. Polym. MP-nr. | TEST 2 Printing Run Length |
|---|---|---|---|---|---|
| Comparative example 9 | POL-01 | — | — | — | 25 000 |
| Example 8 | POL-01 | SR-01 | 2.5 | MP-03 | 33 000 |
| Comparative example 11 | POL-01 | CSR-03 | 2.5 | MP-06 | 26 000 |

Each table demonstrates that those polymers, modified according to the present invention, give rise to a significant increase of the printing run length of the coating compared with unmodified polymers and compared with polymers, modified for the same degree with another substitution reagents than those required for making a polymer according to the present invention.

The invention claimed is:

1. A polymer comprising a phenolic monomeric unit wherein the H atom of the hydroxy group of the phenolic monomeric unit is replaced by a N-imide group Q having the structure

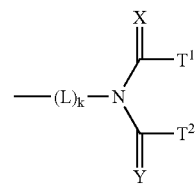

wherein L is a linking group, wherein k is 0 or 1, wherein L is covalently bound to the O atom of the polymer when k is 1, or wherein the N atom of the N-imide group is covalently bound to the O atom of the polymer when k is 0, wherein X or Y are independently selected from O or S, and wherein $T^1$ and $T^2$ represent a terminal group.

2. A polymer according to claim 1 wherein the terminal groups $T^1$ and $T^2$ are independently selected from an optionally substituted alkyl, alkenyl, alkynyl, cycloalkyl, heterocyclic, aryl, heteroaryl, aralkyl or heteroaralkyl group, or wherein $T^1$ and $T^2$ together with the N-imide group represent the necessary atoms to form a cyclic structure, or wherein $T^1$ and $T^2$ represent the following structures $-L^1-R^1$ and $-L^2-R^2$, wherein $L^1$ and $L^2$ represent independently a linking group, wherein $R^1$ and $R^2$ are independently selected from hydrogen, an optionally substituted alkyl, alkenyl, alkynyl, cycloalkyl, heterocyclic, aryl, heteroaryl, aralkyl or heteroaralkyl group, halogen, —CN, or —$NO_2$, or therein two groups selected from each $L^1$, $L^2$, $R^1$ and $R^2$ together represent the necessary atoms to form a cyclic structure.

3. A polymer according to claim 1 wherein the N-imide group Q has the following formula

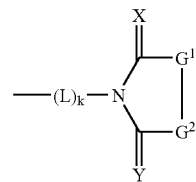

wherein $G^1$ and $G^2$ are independently selected from O, S, $NR^3$ or $CR^4R^5$, with the limitation that $G^1$ is not O or S when $G^2$ is O and that $G^1$ is not O or S when $G^2$ is $NR^3$, wherein $R^4$ and $R^5$ are independently selected from hydrogen, an optionally substituted alkyl, alkenyl, alkynyl, cycloalkyl, heterocyclic, aryl, heteroaryl, aralkyl or heteroaralkyl group or $-L^3-R^6$, wherein $L^3$ is a linking group, wherein $R^3$ and $R^6$ are independently selected from hydrogen or an optionally substituted alkyl, alkenyl, alkynyl, cycloalkyl, heterocyclic, aryl, heteroaryl, aralkyl or heteroaralkyl group, or wherein two groups selected from each $R^3$, $R^4$, $R^5$, $R^6$ and $L^3$ together represent the necessary atoms to form a cyclic structure.

4. A polymer according to claim 1 wherein the N-imide group Q has the following formula

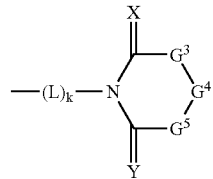

wherein $G^3$ to $G^5$ are independently selected from O, S, $NR^7$ or $CR^8R^9$, with the limitation that at least one group, selected from $G^3$ to $G^5$, is $CR^8R^9$ and that two neighboring groups, selected from $G^3$ to $G^5$ are not represented by O and S, by O and $NR^7$, by S and $NR^7$ or by O and O, or wherein $G^4$ is a linking group, wherein $R^8$ and $R^9$ are independently selected from hydrogen, an optionally substituted alkyl, alkenyl, alkynyl, cycloalkyl, heterocyclic, aryl, heteroaryl, aralkyl or heteroaralkyl group or -$L^4$-$L^{10}$, wherein $L^4$ is a linking group, wherein $R^7$ and $R^{10}$ are independently selected from hydrogen or an optionally substituted alkyl, alkenyl, alkynyl, cycloalkyl, heterocyclic, aryl, heteroaryl, aralkyl or heteroaralkyl group, or wherein two groups selected from each $R^7$, $R^8$, $R^9$, $R^{10}$ and $L^4$ together represent the necessary atoms to form a cyclic structure.

5. A polymer according to claim 1 wherein the N-imide group Q has the following formula

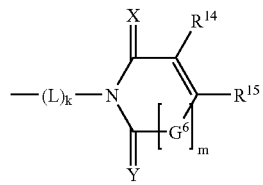

wherein $G^6$ is a group selected from O, S, $NR^{11}$ or $CR^{12}R^{13}$, wherein m is 0 or 1, wherein $R^{12}$ to $R^{15}$ are independently selected from hydrogen, an optionally substituted alkyl, alkenyl, alkynyl, cycloalkyl, heterocyclic, aryl, heteroaryl, aralkyl or heteroaralkyl group or -$L^5$-$R^{16}$, wherein $L^5$ is a linking group, wherein $R^{11}$ and $R^{16}$ are independently selected from hydrogen or an optionally substituted alkyl, alkenyl, alkynyl, cycloalkyl, heterocyclic, aryl, heteroaryl, aralkyl or heteroaralkyl group, or wherein two groups selected from each $R^{11}$, $R^{12}$, $R^{13}$, $R^{14}$, $R^{15}$, $R^{16}$ and $L^5$ together represent the necessary atoms to form a cyclic structure.

6. A polymer according to claim 1 wherein the N-imide group Q has the following formula

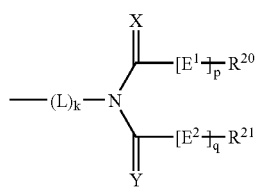

wherein $E^1$ and $E^2$ are independently selected from O, S, $NR^{17}$ or $CR^{18}R^{19}$, wherein p and q are independently 0 or 1, wherein $R^{18}$ to $R^{21}$ are independently selected from hydrogen, an optionally substituted alkyl, alkenyl, alkynyl, cycloalkyl, heterocyclic, aryl, heteroaryl, aralkyl or heteroaralkyl group or -$L^6$-$R^{22}$, wherein $L^6$ is a linking group, wherein $R^{17}$ and $R^{22}$ are independently selected from hydrogen or an optionally substituted alkyl, alkenyl, alkynyl, cycloalkyl, heterocyclic, aryl, heteroaryl, aralkyl or heteroaralkyl group.

7. A polymer according to claim 1 wherein the N-imide group Q has one of the following formula:

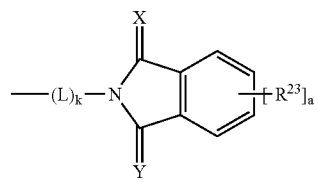

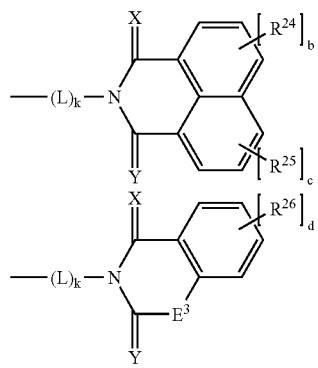

wherein each $R^{23}$ to $R^{26}$ are independently selected from hydrogen, an optionally substituted alkyl, alkenyl, alkynyl, cycloalkyl, heterocyclic, aryl, heteroaryl, aralkyl or heteroaralkyl group, halogen, —$SO_2$—NH—$R^{27}$, —NH—$SO_2$—$R^{30}$, —CO—$NR^{27}$—$R^{28}$, —$NR^{27}$—CO—$R^{30}$, —$NR^{27}$—CO—$NR^{28}$—$R^{29}$, —$NR^{27}$—CS—$NR^{28}$—$R^{29}$, —$NR^{27}$—CO—O—$R^{28}$, —O—CO—$NR^{27}$—$R^{28}$, —O—CO—$R^{30}$, —CO—O—$R^{27}$, —CO—$R^{27}$, —$SO_3$—$R^{27}$, —O—$SO_2$—$R^{30}$, —$SO_2$—$R^{27}$, —SO—$R^{30}$, —P(=O)(—O—$R^{27}$)(—O—$R^{28}$), —O—P(=O)(—O—$R^{27}$)(—O—$R^{28}$), —$NR^{27}$—$R^{28}$, —O—$R^{27}$, —S—$R^{27}$, —CN, —$NO_2$, —N(—CO—$R^{27}$)(—CO—$R^{28}$), —N-phthalimidyl, -M-N-phthalimidyl, or -M-$R^{27}$, wherein M represents a divalent linking group containing 1 to 8 carbon atoms, wherein $R^{27}$ to $R^{29}$ are independently selected from hydrogen or an optionally substituted alkyl, alkenyl, alkynyl, cycloalkyl, heterocyclic, aryl, heteroaryl, aralkyl or heteroaralkyl group, wherein $R^{30}$ is selected from an optionally substituted alkyl, alkenyl, alkynyl, cycloalkyl, heterocyclic, aryl, heteroaryl, aralkyl or heteroaralkyl group, wherein a and d are independently 0, 1, 2, 3 or 4, wherein b and c are independently 0, 1, 2 or 3, wherein $E^3$ is selected from O, S, $NR^{31}$ or $CR^{32}R^{33}$, wherein $R^{32}$ and $R^{33}$ are independently selected from hydrogen, an optionally substituted alkyl, alkenyl, alkynyl, cycloalkyl, heterocyclic, aryl, heteroaryl, aralkyl or heteroaralkyl group, or -$L^7$-$R^{34}$, wherein $L^7$ is a linking group, wherein $R^{31}$ and $R^{34}$ are independently selected from hydrogen or an optionally substituted alkyl, alkenyl, alkynyl, cycloalkyl, heterocyclic, aryl, heteroaryl, aralkyl or heteroaralkyl group.

8. A polymer according to claim 1 wherein the N-imide group Q has one of the following formula:

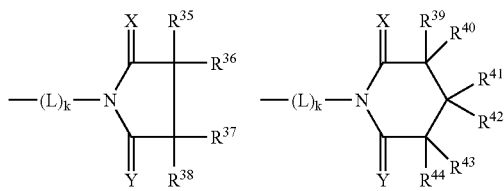

wherein $R^{35}$ to $R^{44}$ are independently selected from hydrogen, an optionally substituted alkyl, alkenyl, alkynyl, cycloalkyl, heterocyclic, aryl, heteroaryl, aralkyl or heteroaralkyl group, halogen, $—SO_2—NH—R^{45}$, $—NH—SO_2—R^{48}$, $—CO—NR^{45}—R^{46}$, $—NR^{45}—CO—R^{48}$, $—NR^{45}—CO—NR^{46}—R^{47}$, $—NR^{45}—CS—NR^{46}—R^{47}$, $—NR^{45}—CO—O—R^{46}$, $—O—CO—NR^{45}—R^{46}$, $—O—CO—R^{48}$, $—CO—O—R^{45}$, $—CO—R^{45}$, $—SO_3—R^{45}$, $—O—SO_2—R^{48}$, $—SO_2—R^{45}$, $—SO—R^{48}$, $—P(=O)(O—R^{45})(—O—R^{46})$, $—O—P(=O)(—O—R^{45})(—O—R^{46})$, $—NR^{45}—R^{46}$, $—O—R^{45}$, $—S—R^{45}$, $—CN$, $—N(—CO—R^{45})(—CO—R^{46})$, —N-phthalimidyl, -M-N-phthalimidyl, or -M-$R^{45}$, wherein M represents a divalent linking group containing 1 to 8 carbon atoms, wherein $R^{45}$ to $R^{47}$ are independently selected from hydrogen or an optionally substituted alkyl, alkenyl, alkynyl, cycloalkyl, heterocyclic, aryl, heteroaryl, aralkyl or heteroaralkyl group, and wherein $R^{48}$ is selected from an optionally substituted alkyl, alkenyl, alkynyl, cycloalkyl, heterocyclic, aryl, heteroaryl, aralkyl or heteroaralkyl group.

9. A polymer according to claim 1 wherein the N-imide group Q has one of the following formula:

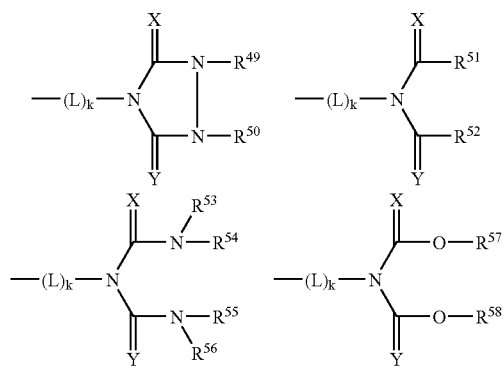

wherein $R^{49}$ to $R^{56}$ are independently selected from hydrogen or an optionally substituted alkyl, alkenyl, alkynyl, cycloalkyl, heterocyclic, aryl, heteroaryl, aralkyl or heteroaralkyl group, and wherein $R^{57}$ and $R^{58}$ are independently selected from an optionally substituted alkyl, alkenyl, alkynyl, cycloalkyl, heterocyclic, aryl, heteroaryl, aralkyl or heteroaralkyl group.

10. A polymer according to claim 1 wherein the N-imide group Q has one of the following formula:

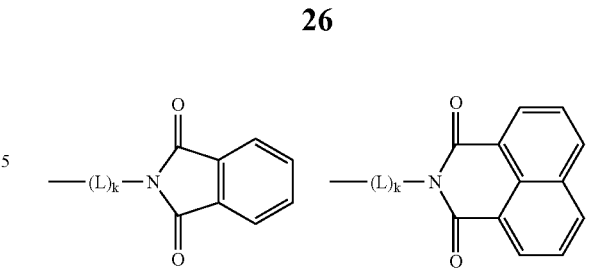

11. A polymer according to claim 1, wherein said polymer comprising a phenolic monomeric unit is a novolac, resol or polyvinylphenol.

12. A heat-sensitive lithographic printing plate precursor comprising a support having a hydrophilic surface and an oleophilic coating provided on the hydrophilic surface, said coating comprising an infrared light absorbing agent and a polymer comprising a phenolic monomeric unit wherein the H atom of the hydroxy group of the phenolic monomeric unit is replaced by a N-imide group Q having the structure

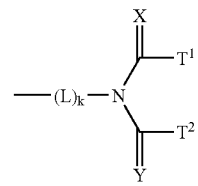

wherein L is a linking group, wherein k is 0 or 1, wherein L is covalently bound to the O atom of the polymer when k is 1, or wherein the N atom of the N-imide group is covalently bound to the O atom of the polymer when k is 0, wherein X or Y are independently selected from O or S, and wherein $T^1$ and $T^2$ represent a terminal group.

13. A lithographic printing plate precursor according to claim 12, wherein said coating further comprises a dissolution inhibitor and wherein said precursor is a positive working lithographic printing plate precursor.

14. A lithographic printing plate precursor according to claim 13, wherein said dissolution inhibitor is selected from the group consisting of
an organic compound which comprises at least one aromatic group and a hydrogen bonding site,
a polymer or surfactant comprising siloxane or perfluoroalkyl units, and mixtures thereof.

15. A lithographic printing plate precursor according to claim 12, wherein said coating further comprises a latent Brönsted acid and an acid-crosslinkable compound and wherein said precursor is a negative working lithographic printing plate precursor.

16. A polymer according to claim 2 wherein the N-imide group Q has the following formula

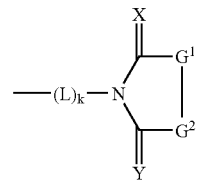

wherein $G^1$ and $G^2$ are independently selected from O, S, $NR^3$ or $CR^4R^5$, with the limitation that $G^1$ is not O or S when $G^2$ is O and that $G^1$ is not O or S when $G^2$ is $NR^3$, wherein $R^4$ and $R^5$ are independently selected from hydrogen, an optionally substituted alkyl, alkenyl, alkynyl, cycloalkyl, heterocyclic, aryl, heteroaryl, aralkyl or heteroaralkyl group or -$L^3$-$R^6$, wherein $L^3$ is a linking group, wherein $R^3$ and $R^6$ are independently selected from hydrogen or an optionally substituted alkyl, alkenyl, alkynyl, cycloalkyl, heterocyclic, aryl, heteroaryl, aralkyl or heteroaralkyl group, or wherein two groups selected from each $R^3$, $R^4$, $R^5$, $R^6$ and $L^3$ together represent the necessary atoms to form a cyclic structure.

17. A polymer according to claim 2 wherein the N-imide group Q has the following formula

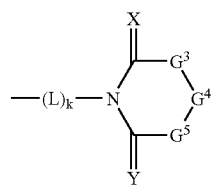

wherein $G^3$ to $G^5$ are independently selected from O, S, $NR^7$ or $CR^8R^9$, with the limitation that at least one group, selected from $G^3$ to $G^5$, is $CR^8R^9$ and that two neighbouring groups, selected from $G^3$ to $G^5$ are not represented by O and S, by O and $NR^7$, by S and $NR^7$ or by O and O, or wherein $G^4$ is a linking group, wherein $R^8$ and $R^9$ are independently selected from hydrogen, an optionally substituted alkyl, alkenyl, alkynyl, cycloalkyl, heterocyclic, aryl, heteroaryl, aralkyl or heteroaralkyl group or -$L^4$-$L^{10}$, wherein $L^4$ is a linking group, wherein $R^7$ and $R^{10}$ are independently selected from hydrogen or an optionally substituted alkyl, alkenyl, alkynyl, cycloalkyl, heterocyclic, aryl, heteroaryl, aralkyl or heteroaralkyl group, or wherein two groups selected from each $R^7$, $R^8$, $R^9$, $R^{10}$ and $L^4$ together represent the necessary atoms to form a cyclic structure.

18. A polymer according to claim 2 wherein the N-imide group Q has the following formula

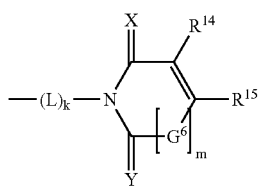

wherein $G^6$ is a group selected from O, S, $NR^{11}$ or $CR^{12}R^{13}$, wherein m is 0 or 1, wherein $R^{12}$ to $R^{15}$ are independently selected from hydrogen, an optionally substituted alkyl, alkenyl, alkynyl, cycloalkyl, heterocyclic, aryl, heteroaryl, aralkyl or heteroaralkyl group or -$L^5$-$R^{16}$, wherein $L^5$ is a linking group, wherein $R^{11}$ and $R^{16}$ are independently selected from hydrogen or an optionally substituted alkyl, alkenyl, alkynyl, cycloalkyl, heterocyclic, aryl, heteroaryl, aralkyl or heteroaralkyl group, or wherein two groups selected from each $R^{11}$, $R^{12}$, $R^{13}$, $R^{14}$, $R^{15}$, $R^{16}$ and $L^5$ together represent the necessary atoms to form a cyclic structure.

19. A polymer according to claim 2 wherein the N-imide group Q has the following formula

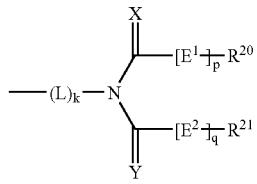

wherein $E^1$ and $E^2$ are independently selected from O, S, $NR^{17}$ or $CR^{18}R^{19}$, wherein p and q are independently 0 or 1, wherein $R^{18}$ to $R^{21}$ are independently selected from hydrogen, an optionally substituted alkyl, alkenyl, alkynyl, cycloalkyl, heterocyclic, aryl, heteroaryl, aralkyl or heteroaralkyl group or -$L^6$-$R^{22}$, wherein $L^6$ is a linking group, wherein $R^{17}$ and $R^{22}$ are independently selected from hydrogen or an optionally substituted alkyl, alkenyl, alkynyl, cycloalkyl, heterocyclic, aryl, heteroaryl, aralkyl or heteroaralkyl group.

20. A polymer according to claim 2 wherein the N-imide group Q has one of the following formula:

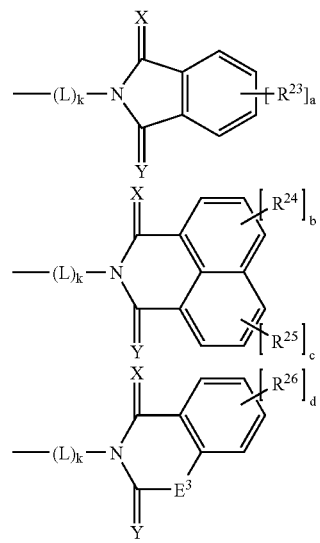

wherein each $R^{23}$ to $R^{26}$ are independently selected from hydrogen, an optionally substituted alkyl alkenyl, alkynyl, cycloalkyl, heterocyclic, aryl, heteroaryl, aralkyl or heteroaralkyl group, halogen, —$SO_2$—NH—$R^{27}$, —NH—$SO_2$—$R^{30}$, —CO—$NR^{27}$—$R^{28}$, —$NR^{27}$—CO—$R^{30}$, —$NR^{27}$—CO—$NR^{28}$—$R^{29}$, —$NR^{27}$—CS—$NR^{28}$—$R^{29}$, —$NR^{27}$—CO—O—$R^{28}$, —O—CO—$NR^{27}R^{28}$, —O—CO—$R^{30}$, —CO—O—$R^{27}$, —CO—$R^{27}$, —$SO_3$—$R^{27}$, —O—$SO_2$—$R^{30}$, —$SO_2$—$R^{27}$, —SO—$R^{30}$, —P(=O)(—O—$R^{27}$)(—O—$R^{28}$), —O—P(=O)(—O—$R^{27}$)(—O—$R^{28}$), —$NR^{27}$—$R^{28}$, —O—$R^{27}$, —S—$R^{27}$, —CN, —$NO_2$, —N(—CO—$R^{27}$)(—CO—$R^{28}$), —N-phthalimidyl, -M-N-phthalimidyl, or -M-$R^{27}$, wherein M represents a divalent linking group containing 1 to 8 carbon atoms, wherein $R^{27}$ to $R^{29}$ are independently selected from hydrogen or an optionally substituted alkyl, alkenyl, alkynyl, cycloalkyl, heterocyclic, aryl, heteroaryl, aralkyl or heteroaralkyl group, wherein $R^{30}$ is selected from an optionally substituted alkyl, alkenyl, alkynyl, cycloalkyl, heterocyclic, aryl, heteroaryl, aralkyl or heteroaralkyl group, wherein a and d are independently 0, 1, 2, 3 or 4, wherein b and c are independently 0, 1, 2 or 3, wherein E³ is selected from O, S, NR³¹ or CR³²R³³, wherein R³² and R³³ are independently selected from hydrogen, an optionally substituted alkyl, alkenyl, alkynyl, cycloalkyl, heterocyclic, aryl, heteroaryl, aralkyl or heteroaralkyl group, or -L⁷-R³⁴, wherein L⁷ is a linking group, wherein R³¹ and R³⁴ are independently selected from hydrogen or an optionally substituted alkyl, alkenyl, alkynyl, cycloalkyl, heterocyclic, aryl, heteroaryl, aralkyl or heteroaralkyl group.

21. A polymer according to claim 2 wherein the N-imide group Q has one of the following formula:

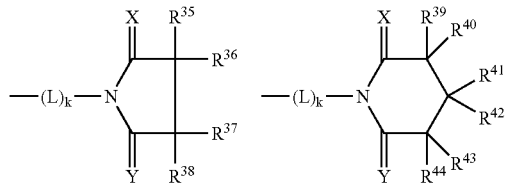

wherein R³⁵ to R⁴⁴ are independently selected from hydrogen, an optionally substituted alkyl, alkenyl, alkynyl, cycloalkyl, heterocyclic, aryl, heteroaryl, aralkyl or heteroaralkyl group, halogen, —SO₂—NH—R⁴⁵, —NH—SO₂—R⁴⁸, —CO—NR⁴⁵—R⁴⁶, —NR⁴⁵—CO—R⁴⁸, —NR⁴⁵—CO—NR⁴⁶—R⁴⁷, —NR⁴⁵—CS—NR⁴⁶—R⁴⁷, —NR⁴⁵—CO—O—R⁴⁶, —O—CO—NR⁴⁵—R⁴⁶, —O—CO—R⁴⁸, —CO—O—R⁴⁵, —CO—R⁴⁵, —SO₃—R⁴⁵, —O—SO₂—R⁴⁸, —SO₂—R⁴⁵, —SO—R⁴⁸, —P(=O)(O—R⁴⁵)(O—R⁴⁶), —O—P(=O)(O—R⁴⁵)(O—R⁴⁶), —NR⁴⁵—R⁴⁶, —O—R⁴⁵, —S—R⁴⁵, —CN, —N(—CO—R⁴⁵)(—CO—R⁴⁶), —N-phthalimidyl, -M-N-phthalimidyl, or -M-R⁴⁵, wherein M represents a divalent linking group containing 1 to 8 carbon atoms, wherein R⁴⁵ to R⁴⁷ are independently selected from hydrogen or an optionally substituted alkyl, alkenyl, alkynyl, cycloalkyl, heterocyclic, aryl, heteroaryl, aralkyl or heteroaralkyl group, wherein R⁴⁸ is selected from an optionally substituted alkyl, alkenyl, alkynyl, cycloalkyl, heterocyclic, aryl, heteroaryl, aralkyl or heteroaralkyl group.

22. A polymer according to claim 2 wherein the N-imide group Q has one of the following formula:

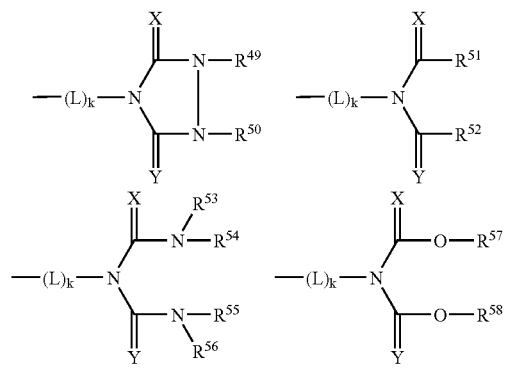

wherein R⁴⁹ to R⁵⁶ are independently selected from hydrogen or an optionally substituted alkyl, alkenyl, alkynyl, cycloalkyl, heterocyclic, aryl, heteroaryl, aralkyl or heteroaralkyl group, and wherein R⁵⁷ and R⁵⁸ are independently selected from an optionally substituted alkyl, alkenyl, alkynyl, cycloalkyl, heterocyclic, aryl, heteroaryl, aralkyl or heteroaralkyl group.

23. A polymer according to claim 2 wherein the N-imide group Q has one of the following formula:

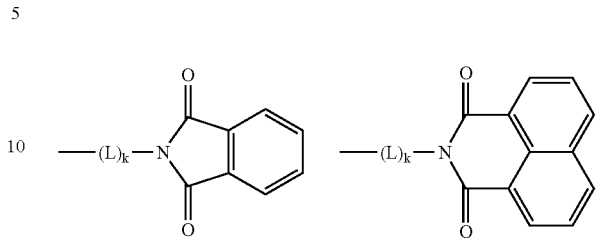

24. A heat-sensitive lithographic printing plate precursor according to claim 12, wherein the terminal groups T¹ and T² are independently selected from an optionally substituted alkyl, alkenyl, alkynyl, cycloalkyl, heterocyclic, aryl, heteroaryl, aralkyl or heteroaralkyl group, or wherein T¹ and T² together with the N-imide group represent the necessary atoms to form a cyclic structure, or wherein T¹ and T² represent the following structures -L¹-R¹ and -L²-R², wherein L¹ and L² represent independently a linking group, wherein R¹ and R² are independently selected from hydrogen, an optionally substituted alkyl, alkenyl, alkynyl, cycloalkyl, heterocyclic, aryl, heteroaryl, aralkyl or heteroaralkyl group, halogen, —CN, or —NO₂, or therein two groups selected from each L¹, L², R¹ and R² together represent the necessary atoms to form a cyclic structure.

25. A heat-sensitive lithographic printing plate precursor according to claim 12, wherein the N-imide group Q has the following formula

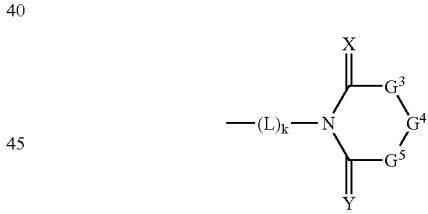

wherein G³ to Gs are independently selected from O, S, NR⁷ or CR⁸R⁹, with the limitation that at least one group, selected from G³ to G⁵, is CR⁸R⁹ and that two neighboring groups, selected from G³ to G⁵, are not represented by O and S, by O and NR⁷, by S and NR⁷ or by O and O, or wherein G⁴ is a linking group, wherein R⁸ and R⁹ are independently selected from hydrogen, an optionally substituted alkyl, alkenyl, alkynyl, cycloalkyl, heterocyclic, aryl, heteroaryl, aralkyl or heteroaralkyl group or -L⁴-L¹⁰, wherein L⁴ is a linking group, wherein R⁷ and R¹⁰ are independently selected from hydrogen or an optionally substituted alkyl, alkenyl, alkynyl, cycloalkyl, heterocyclic, aryl, heteroaryl, aralkyl or heteroaralkyl group, or wherein two groups selected from each R⁷, R⁸, R⁹, R¹⁰ and L⁴ together represent the necessary atoms to form a cyclic structure.

26. A heat-sensitive lithographic printing plate precursor according to claim 12, wherein the N-imide group Q has the following formula

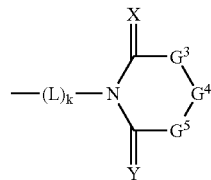

wherein $G^3$ to $G^5$ are independently selected from O, S, $NR^7$ or $CR^8R^9$, with the limitation that at least one group, selected from $G^3$ to $G^5$, is $CR^8R^9$ and that two neighboring groups, selected from $G^3$ to $G^5$, are not represented by O and S, by O and $NR^7$, by S and $NR^7$ or by O and O, or wherein $G^4$ is a linking group, wherein $R^8$ and $R^9$ are independently selected from hydrogen, an optionally substituted alkyl, alkenyl, alkynyl, cycloalkyl, heterocyclic, aryl, heteroaryl, aralkyl or heteroaralkyl group or $-L^4-L^{10}$, wherein $L^4$ is a linking group, wherein $R^7$ and $R^{10}$ are independently selected from hydrogen or an optionally substituted alkyl, alkenyl, alkynyl, cycloalkyl, heterocyclic, aryl, heteroaryl, aralkyl or heteroaralkyl group, or wherein two groups selected from each $R^7$, $R^8$, $R^9$, $R^{10}$ and $L^4$ together represent the necessary atoms to form a cyclic structure.

27. A heat-sensitive lithographic printing plate precursor according to claim 12, wherein the N-imide group Q has the following formula

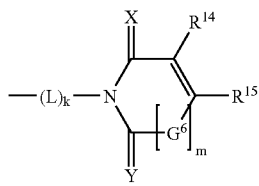

wherein $G^6$ is a group selected from O, S, $NR^{11}$ or $CR^{12}R^{13}$, wherein m is 0 or 1, wherein $R^{12}$ to $R^{15}$ are independently selected from hydrogen, an optionally substituted alkyl, alkenyl, alkynyl, cycloalkyl, heterocyclic, aryl, heteroaryl, aralkyl or heteroaralkyl group or $-L^5-R^{16}$, wherein $L^5$ is a linking group, wherein $R^{11}$ and $R^{16}$ are independently selected from hydrogen or an optionally substituted alkyl, alkenyl, alkynyl, cycloalkyl, heterocyclic, aryl, heteroaryl, aralkyl or heteroaralkyl group, or wherein two groups selected from each $R^{11}$, $R^{12}$, $R^{13}$, $R^{14}$, $R^{15}$, $R^{16}$ and $L^5$ together represent the necessary atoms to form a cyclic structure.

28. A heat-sensitive lithographic printing plate precursor according to claim 12, wherein the N-imide group Q has the following formula

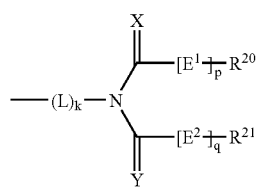

wherein $E^1$ and $E^2$ are independently selected from O, S, $NR^{17}$ or $CR^{18}R^{19}$, wherein p and q are independently 0 or 1, wherein $R^{18}$ to $R^{21}$ are independently selected from hydrogen, an optionally substituted alkyl, alkenyl, alkynyl, cycloalkyl, heterocyclic, aryl, heteroaryl, aralkyl or heteroaralkyl group or $-L^6-R^{22}$, wherein $L^6$ is a linking group, wherein $R^{17}$ and $R^{22}$ are independently selected from hydrogen or an optionally substituted alkyl, alkenyl, alkynyl, cycloalkyl, heterocyclic, aryl, heteroaryl, aralkyl or heteroaralkyl group.

29. A heat-sensitive lithographic printing plate precursor according to claim 12, wherein the N-imide group Q has one of the following formula:

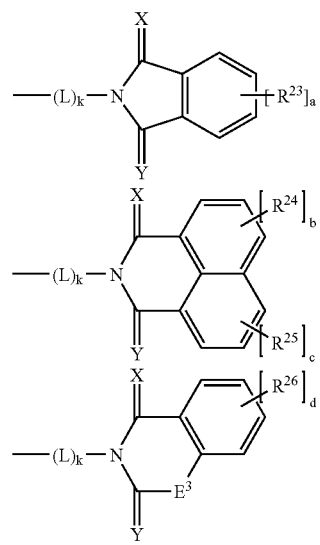

wherein each $R^{23}$ to $R^{26}$ are independently selected from hydrogen, an optionally substituted alkyl, alkenyl, alkynyl, cycloalkyl, heterocyclic, aryl, heteroaryl, aralkyl or heteroaralkyl group, halogen, $-SO_2-NH-R^{27}$, $-NH-SO_2-R^{30}$, $-CO-NR^{27}-R^{28}$, $-NR^{27}-CO-R^{30}$, $-NR^{27}-CO-NR^{28}-R^{29}$, $-NR^{27}-CS-NR^{28}-R^{29}$, $-NR^{27}-CO-O-R^{28}$, $-O-CO-NR^{27}-R^{28}$, $-O-CO-R^{30}$, $-CO-O-R^{27}$, $-CO-R^{27}$, $-SO_3-R^{27}$, $-O-SO_2-R^{30}$, $-SO_2-R^{27}$, $-SO-R^{30}$, $-P(=O)(-O-R^{27})(-O-R^{28})$, $-O-P(=O)(-O-R^{27})(-O-R^{28})$, $-NR^{27}-R^{28}$, $O-R^{27}$, $-S-R^{27}$, $-CN$, $-NO_2$, $-N(-CO-R^{27})(-CO-R^{28})$, $-N$-phthalimidyl, $-M$-$N$-phthalimidyl, or $-M-R^{27}$, wherein M represents a divalent linking group containing 1 to 8 carbon atoms, wherein $R^{27}$ to $R^{29}$ are independently selected from hydrogen or an optionally substituted alkyl, alkenyl, alkynyl, cycloalkyl, heterocyclic, aryl, heteroaryl, aralkyl or heteroaralkyl group, wherein $R^{30}$ is selected from an optionally substituted alkyl, alkenyl, alkynyl, cycloalkyl, heterocyclic, aryl, heteroaryl, aralkyl or heteroaralkyl group, wherein a and d are independently 0, 1, 2, 3 or 4, wherein b and c are independently 0, 1, 2 or 3, wherein $E^3$ is selected from O, S, $NR^{31}$ or $CR^{32}R^{33}$, wherein $R^{32}$ and $R^{33}$ are independently selected from hydrogen, an optionally substituted alkyl, alkenyl, alkynyl, cycloalkyl, heterocyclic, aryl, heteroaryl, aralkyl or heteroaralkyl group, or $-L^7-R^{34}$, wherein $L^7$ is a linking group, wherein $R^{31}$ and $R^{34}$ are independently selected from hydrogen or an optionally substituted alkyl, alkenyl, alkynyl, cycloalkyl, heterocyclic, aryl, heteroaryl, aralkyl or heteroaralkyl group.

30. A heat-sensitive lithographic printing plate precursor according to claim 12, wherein the N-imide group Q has one of the following formula:

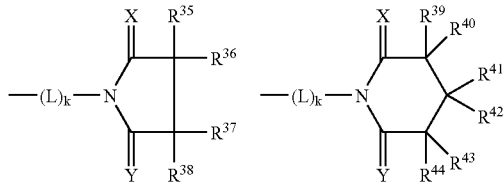

wherein $R^{35}$ to $R^{44}$ are independently selected from hydrogen, an optionally substituted alkyl, alkenyl, alkynyl, cycloalkyl, heterocyclic, aryl, heteroaryl, aralkyl or heteroaralkyl group, halogen, —$SO_2$—NH—$R^{45}$, —NH—$SO_2$—$R^{48}$, —CO—$NR^{45}$—$R^{46}$, —$NR^{45}$—CO—$R^{48}$, —$NR^{45}$—CO—$NR^{46}$—$R^{47}$, —$NR^{45}$—CS—$NR^{46}$—$R^{47}$, —$NR^{45}$—CO—O—$R^{46}$, —O—CO—$NR^{45}$—$R^{46}$, —O—CO—$R^{48}$, —CO—O—$R^{45}$, —CO—$R^{45}$, —$SO_3$—$R^{45}$, —O—$SO_2$—$R^{48}$, —$SO_2$—$R^{45}$, —SO—$R^{48}$, —P(=O)(O—$R^{45}$)(—O—$R^{46}$), —O—P(=O)(—O—$R^{45}$)(—O—$R^{46}$), —$NR^{45}$—$R^{46}$, —O—$R^{45}$, —S—$R^{45}$—CN, —N(—CO—$R^{45}$)(—CO—$R^{46}$), —N-phthalimidyl, -M-N-phthalimidyl, or -M-$R^{45}$, wherein M represents a divalent linking group containing 1 to 8 carbon atoms, wherein $R^{45}$ to $R^{47}$ are independently selected from hydrogen or an optionally substituted alkyl, alkenyl, alkynyl, cycloalkyl, heterocyclic, aryl, heteroaryl, aralkyl or heteroaralkyl group, wherein $R^{48}$ is selected from an optionally substituted alkyl, alkenyl, alkynyl, cycloalkyl, heterocyclic, aryl, heteroaryl, aralkyl or heteroaralkyl group.

31. A heat-sensitive lithographic printing plate precursor according to claim 12, wherein the N-imide group Q has one of the following formula:

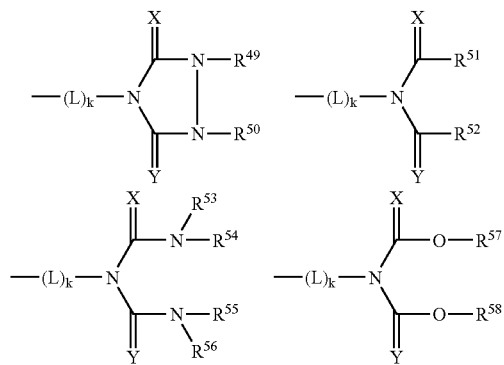

wherein $R^{49}$ to $R^{56}$ are independently selected from hydrogen or an optionally substituted alkyl, alkenyl, alkynyl, cycloalkyl, heterocyclic, aryl, heteroaryl, aralkyl or heteroaralkyl group, and wherein $R^{57}$ and $R^{58}$ are independently selected from an optionally substituted alkyl, alkenyl, alkynyl, cycloalkyl, heterocyclic, aryl, heteroaryl, aralkyl or heteroaralkyl group.

32. A heat-sensitive lithographic printing plate precursor according to claim 12, wherein the N-imide group Q has one of the following formula:

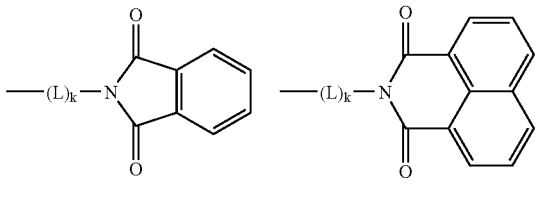

33. A heat-sensitive lithographic printing plate precursor according to claim 24, wherein said coating further comprises a dissolution inhibitor and wherein said precursor is a positive working lithographic printing plate precursor.

34. A heat-sensitive lithographic printing plate precursor according to claim 25, wherein said coating further comprises a dissolution inhibitor and wherein said precursor is a positive working lithographic printing plate precursor.

35. A heat-sensitive lithographic printing plate precursor according to claim 26, wherein said coating further comprises a dissolution inhibitor and wherein said precursor is a positive working lithographic printing plate precursor.

36. A heat-sensitive lithographic printing plate precursor according to claim 27, wherein said coating further comprises a dissolution inhibitor and wherein said precursor is a positive working lithographic printing plate precursor.

37. A heat-sensitive lithographic printing plate precursor according to claim 28, wherein said coating further comprises a dissolution inhibitor and wherein said precursor is a positive working lithographic printing plate precursor.

38. A heat-sensitive lithographic printing plate precursor according to claim 29, wherein said coating further comprises a dissolution inhibitor and wherein said precursor is a positive working lithographic printing plate precursor.

39. A heat-sensitive lithographic printing plate precursor according to claim 30, wherein said coating further comprises a dissolution inhibitor and wherein said precursor is a positive working lithographic printing plate precursor.

40. A heat-sensitive lithographic printing plate precursor according to claim 31, wherein said coating further comprises a dissolution inhibitor and wherein said precursor is a positive working lithographic printing plate precursor.

41. A heat-sensitive lithographic printing plate precursor according to claim 32, wherein said coating further comprises a dissolution inhibitor and wherein said precursor is a positive working lithographic printing plate precursor.

42. A heat-sensitive lithographic printing plate precursor according to claim 24, wherein said coating further comprises a latent Brönsted acid and an acid-crosslinkable compound and wherein said precursor is a negative working lithographic printing plate precursor.

43. A heat-sensitive lithographic printing plate precursor according to claim 25, wherein said coating further comprises a latent Brönsted acid and an acid-crosslinkable compound and wherein said precursor is a negative working lithographic printing plate precursor.

44. A heat-sensitive lithographic printing plate precursor according to claim 26, wherein said coating further comprises a latent Brönsted acid and an acid-crosslinkable compound and wherein said precursor is a negative working lithographic printing plate precursor.

45. A heat-sensitive lithographic printing plate precursor according to claim 27, wherein said coating further comprises a latent Brönsted acid and an acid-crosslinkable compound and wherein said precursor is a negative working lithographic printing plate precursor.

46. A heat-sensitive lithographic printing plate precursor according to claim 28, wherein said coating further comprises a latent Brönsted acid and an acid-crosslinkable compound and wherein said precursor is a negative working lithographic printing plate precursor.

47. A heat-sensitive lithographic printing plate precursor according to claim 29, wherein said coating further comprises a latent Brönsted acid and an acid-crosslinkable compound and wherein said precursor is a negative working lithographic printing plate precursor.

48. A heat-sensitive lithographic printing plate precursor according to claim 30, wherein said coating further comprises a latent Brönsted acid and an acid-crosslinkable compound and wherein said precursor is a negative working lithographic printing plate precursor.

49. A heat-sensitive lithographic printing plate precursor according to claim 31, wherein said coating further comprises a latent Brönsted acid and an acid-crosslinkable compound and wherein said precursor is a negative working lithographic printing plate precursor.

50. A heat-sensitive lithographic printing plate precursor according to claim 32, wherein said coating further comprises a latent Brönsted acid and an acid-crosslinkable compound and wherein said precursor is a negative working lithographic printing plate precursor.

* * * * *